(12) United States Patent
Zhang et al.

(10) Patent No.: US 11,490,081 B2
(45) Date of Patent: Nov. 1, 2022

(54) UNEQUAL WEIGHTED SAMPLE AVERAGES FOR BILATERAL FILTER

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/150,256

(22) Filed: Jan. 15, 2021

(65) Prior Publication Data

US 2021/0144409 A1 May 13, 2021

Related U.S. Application Data

(63) Continuation of application No. PCT/IB2019/057039, filed on Aug. 21, 2019.

(30) Foreign Application Priority Data

Aug. 21, 2018 (WO) ................ PCT/CN2018/101479

(51) Int. Cl.
*H04N 19/00* (2014.01)
*H04N 19/117* (2014.01)
(Continued)

(52) U.S. Cl.
CPC .............. *H04N 19/117* (2014.11); *G06T 9/40* (2013.01); *H04N 19/12* (2014.11);
(Continued)

(58) Field of Classification Search
CPC .... H04N 19/117; H04N 19/12; H04N 19/124; H04N 19/176; H04N 19/184; H04N 19/635; H04N 19/80; G06T 9/40
See application file for complete search history.

(56) References Cited

U.S. PATENT DOCUMENTS

2009/0317014 A1 12/2009 Porikli
2017/0221183 A1 8/2017 Mody et al.
(Continued)

FOREIGN PATENT DOCUMENTS

CN 104041051 A 9/2014
CN 105359526 A 2/2016
(Continued)

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
(Continued)

*Primary Examiner* — Zhihan Zhou
(74) *Attorney, Agent, or Firm* — Perkins Coie LLP

(57) ABSTRACT

A method for video bitstream processing includes determining, by a processor, that a reconstructed representation of a current sample of video data is to be subject to a bilateral filter defined by one or more parameters based, at least in part, on a weighted sum of sample intensity differences ($S_{Diff}$) between a first window covering the current sample and a second window covering a neighboring sample, wherein multiple sample intensity differences are assigned unequal weights; and applying the bilateral filter defined by the one or more parameters to the reconstructed representation of the current sample of the video data.

20 Claims, 25 Drawing Sheets

(51) Int. Cl.

| | |
|---|---|
| *H04N 19/124* | (2014.01) |
| *H04N 19/176* | (2014.01) |
| *H04N 19/184* | (2014.01) |
| *H04N 19/80* | (2014.01) |
| *G06T 9/40* | (2006.01) |
| *H04N 19/12* | (2014.01) |
| *H04N 19/635* | (2014.01) |

(52) U.S. Cl.
CPC ......... *H04N 19/124* (2014.11); *H04N 19/176* (2014.11); *H04N 19/184* (2014.11); *H04N 19/635* (2014.11); *H04N 19/80* (2014.11)

(56) References Cited

U.S. PATENT DOCUMENTS

| | | | |
|---|---|---|---|
| 2018/0184126 A1 | 6/2018 | Zhang et al. | |
| 2018/0184127 A1 | 6/2018 | Zhang et al. | |
| 2019/0082176 A1* | 3/2019 | Zhang | H04N 19/176 |

FOREIGN PATENT DOCUMENTS

| | | |
|---|---|---|
| CN | 107810636 A | 3/2018 |
| WO | 2016091161 A1 | 6/2016 |
| WO | 2018067051 A1 | 4/2018 |
| WO | 2018097700 A1 | 5/2018 |
| WO | 2018117938 A1 | 6/2018 |
| WO | 2018134362 A1 | 7/2018 |
| WO | 2018134363 A1 | 7/2018 |

OTHER PUBLICATIONS

Chen et al. "Description of SDR and HDR and 360 degree Video Coding Technology Proposal by Qualcomm and Technicolor—Low and High Complexity Versions," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0021, 2018.

Hsiang et al. "CE7.3.2: Extension of Quantization Parameter Value Range," Joint Video Experts Team (JVET) of ITU-T SG 16 WP 3 and ISO/IEC JTC 1/SC 29/WG 11 11th Meeting, Ljubljana, SI, Jul. 10-18, 2018, document JVET-K0251, 2018.

H.265/HEVC, https://www.itu.int/rec/T-REC-H.265.

JEM-7.0: https://jvet.hhi.fraunhofer.de/svn/svn_HMJEMSoftware/tags/HM-16.6-JEM-7.0.

Gadde et al. "CE2.1.3: In-Loop Bilateral Filter," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0384, 2018.

Jian et al. "Window Mode Filter for Image Denoising," TENCON 2010, 2010 IEEE Region 10 Conference, IEEE, Piscataway, NJ, USA, Nov. 21, 2010, pp. 1641-1646.

Li et al. "Multi-Type-Tree." Joint Video Exploration Team (JVET), of ITU-T SG 16 WP 3 and ISO/IEC JTC 1/SC 29/WG 11, 4th Meeting: Chengdu, CN, Oct. 15-21, 2016, document JVET-D0117r1, 2016.

Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.

Strom et al. "Bilateral Filter After Inverse Transform," Joint Video Exploration Team (JVET) of ITU-T SG 16 WP 3 and iSO/IEC JTC 1/SC 29/WG 11, 4th Meeting, Chengdu, CN, Oct. 15-21, 2016, document JVET-D0069, 2016.

Strom et al. "EE2-JVET Related: Division-Free Bilateral Filter," Joint Video Exploration Team (JVET) of ITU-T SG 16 WP 3 and ISO/IEC JTC 1/SC 29/WG 11, 6th Meeting, Hobard, AU, Mar. 31-Apr. 7, 2017, document JVET-F0096, 2017.

Su et al. "CE2.1.2: Bilateral Filter—Spatial Filter Strength Adjustment," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0231, 2018.

Sullivan et al. "Overview of the High Efficiency Video Coding (HEVC) Standard," IEEE Transactions on Circuits and Systems for Video Technology, Dec. 2012, 22(12):1649-1668.

Wennersten et al. "Bilateral Filtering for Video Coding," 2017 IEEE Visual Communications and Image Processing (VCIP), IEEE, Dec. 10, 2017, pp. 1-4.

Zhang et al. "Description of Core Experiment 14 (CE14): Post-Reconstruction Filtering," Joint Video Experts Team (JVET) of ITU-T SG 16 WP 3 and iSO/IEC JTC 1/SC 29/WG 11, 11th Meeting, Ljubljana, SI, Jul. 10-18, 2018, document JVET-K1034, 2018.

International Search Report and Written Opinion from International Patent Application No. PCT/IB2019/057038 dated Jan. 28, 2020 (19 pages).

International Search Report and Written Opinion from International Patent Application No. PCT/IB2019/057039 dated Dec. 4, 2019 (16 pages).

International Search Report and Written Opinion from International Patent Application No. PCT/IB2019/057040 dated Dec. 16, 2019 (16 pages).

International Search Report and Written Opinion from International Patent Application No. PCT/IB2019/057041 dated Jan. 2, 2020 (17 pages).

* cited by examiner

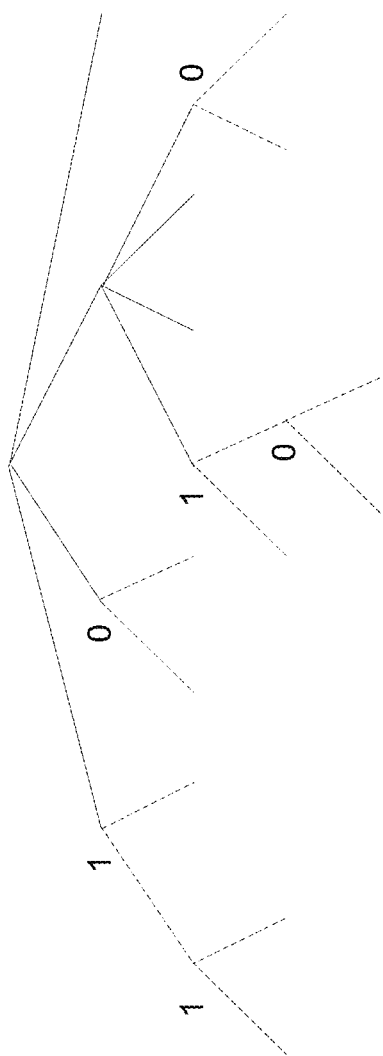
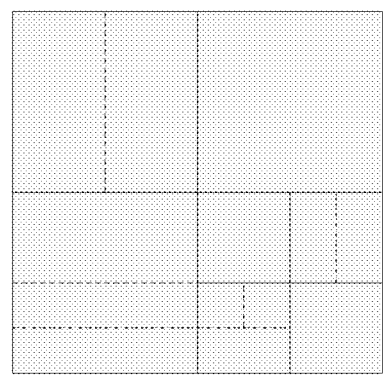
FIG. 4B
FIG. 4A

UNEQUAL WEIGHTED SAMPLE AVERAGES FOR BILATERAL FILTER

CROSS REFERENCE TO RELATED APPLICATIONS

This application is a continuation of International Application No. PCT/IB2019/057039, filed on Aug. 21, 2019, which claims the priority to and benefits of International Patent Application No. PCT/CN2018/101479, filed on Aug. 21, 2018. All the aforementioned patent applications are hereby incorporated by reference in their entireties.

TECHNICAL FIELD

This document is related to video coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video decoder or encoder embodiments for in which a bilateral filter can be applied.

In one example aspect, a method of video bitstream processing is disclosed. The method includes determining, by a processor, that a reconstructed representation of a first portion of video data is to be subject to a bilateral filter at least based on sample intensity values of neighboring samples, the determination based on information signaled in one or more of: a sequence parameter set, a picture parameter set, a slice header, a picture header, a coding tree unit (CTU), a coding tree block (CTB), or a group of coding units (CUs); and based on the determination, applying the bilateral filter to a reconstructed representation of the first portion of the video data.

In another example aspect, a method of video bitstream processing includes determining, by a processor, based on information signaled in a bitstream, that a first portion of video data is associated with a quantization parameter (QP) that is larger than a threshold QP; and determining that a reconstructed representation of the first portion is exempt from a bilateral filter based on the determination that the QP is larger than the threshold QP, wherein the bilateral filter is at least based on sample intensity values of neighboring samples.

In another example aspect, a method of video bitstream processing includes determining, by a processor, a first coding mode of a first portion of video data and a second coding mode of a second portion of the video data; and applying a bilateral filter based on the first coding mode to a reconstructed representation of the first portion of the video data, wherein the bilateral filter is at least based on sample intensity values of neighboring samples.

In another example aspect, a method of video bitstream processing includes determining, by a processor, that a reconstructed representation of a first portion of video data is to be subject to a bilateral filter at least based on sample intensity values of neighboring samples, wherein the first portion of the video data is associated with a quantization parameter (QP); and applying the bilateral filter to the reconstructed representation of the first portion of the video data based on the QP.

In another example aspect, a method of video bitstream processing includes determining, by a processor, that a reconstructed representation of a current sample of video data is to be subject to a bilateral filter defined by one or more parameters based, at least in part, on a weighted sum of sample intensity differences ($S_{Diff}$ values) between a first window covering the current sample and a second window covering neighboring samples, wherein multiple sample intensity differences are assigned a same parameter from the one or more parameters; and applying the bilateral filter defined by the one or more parameters to the reconstructed representation of the current sample of the video data.

In another example aspect, a method of video bitstream processing includes determining, by a processor, that a reconstructed representation of a current sample of video data is to be subject to a bilateral filter defined by one or more parameters based, at least in part, on sample intensity differences (SDiff values) between the current sample and one or more neighboring samples, wherein multiple sample intensity differences are assigned a same parameter from the one or more parameters; and applying the bilateral filter defined by the one or more parameters to the reconstructed representation of the current sample of the video data.

In another example aspect, a method of video bitstream processing includes determining, by a processor, that a reconstructed representation of a current sample of video data is to be subject to a bilateral filter defined by one or more parameters based, at least in part, on a weighted sum of sample intensity differences ($S_{Diff}$) between a first window covering the current sample and a second window covering a neighboring sample, wherein multiple sample intensity differences are assigned unequal weights; and applying the bilateral filter defined by the one or more parameters to the reconstructed representation of the current sample of the video data.

In another example aspect, a method of video bitstream processing includes determining, by a processor, that a reconstructed representation of a current sample of video data is to be subject to a bilateral filter defined by one or more parameters based, at least in part, on a weighted sum of a subset of sample intensity differences between a first window covering a current sample and a second window covering a neighboring sample, wherein multiple sample intensity differences are assigned a same weight; and applying the bilateral filter defined by the one or more parameters to the reconstructed representation of the current sample of the video data.

In another example aspect, a method of video bitstream processing includes determining, by a processor, that a reconstructed representation of a first portion of video data is to be subject to a bilateral filter defined by one or more parameters based, at least in part, on a weighted sum of a subset of sample intensity differences between a first window covering a current sample and a second window covering a neighboring sample, wherein multiple sample intensity differences are assigned unequal weights; and applying the bilateral filter defined by the one or more parameters to the reconstructed representation of the current sample of the video data.

In another example aspect, the above-described method may be implemented by a video decoder apparatus that comprises a processor.

In another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIGS. 4A-4B shows examples of a quadtree plus binary tree (QTBT) structure.

DETAILED DESCRIPTION

The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for improving readability and do not limit the scope of techniques and embodiments described in each section only to that section. Furthermore, while certain terms from various existing video codec standards are used, the disclosed technologies are not limited only to these video standards or their successors and are applicable to other video codec standards. Furthermore, in some cases, techniques are disclosed using corresponding coding steps, and it will be understood that, at a decoder, the corresponding decoding steps in reverse order will be performed. In addition, coding may also be used to perform transcoding in which a video is represented from one coded representation (e.g., one bitrate) to another coded representation (e.g., a different bitrate).

1 Summary

The disclosed technology is related to video coding technologies. Specifically, it is related to post-reconstruction filters, e.g., bilateral filter in image/video coding. It may be applied to the existing video coding standard like HEVC, or the standard (Versatile Video Coding) to be finalized. It may be also applicable to future video coding standards or video codec.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized.

Figure 12:
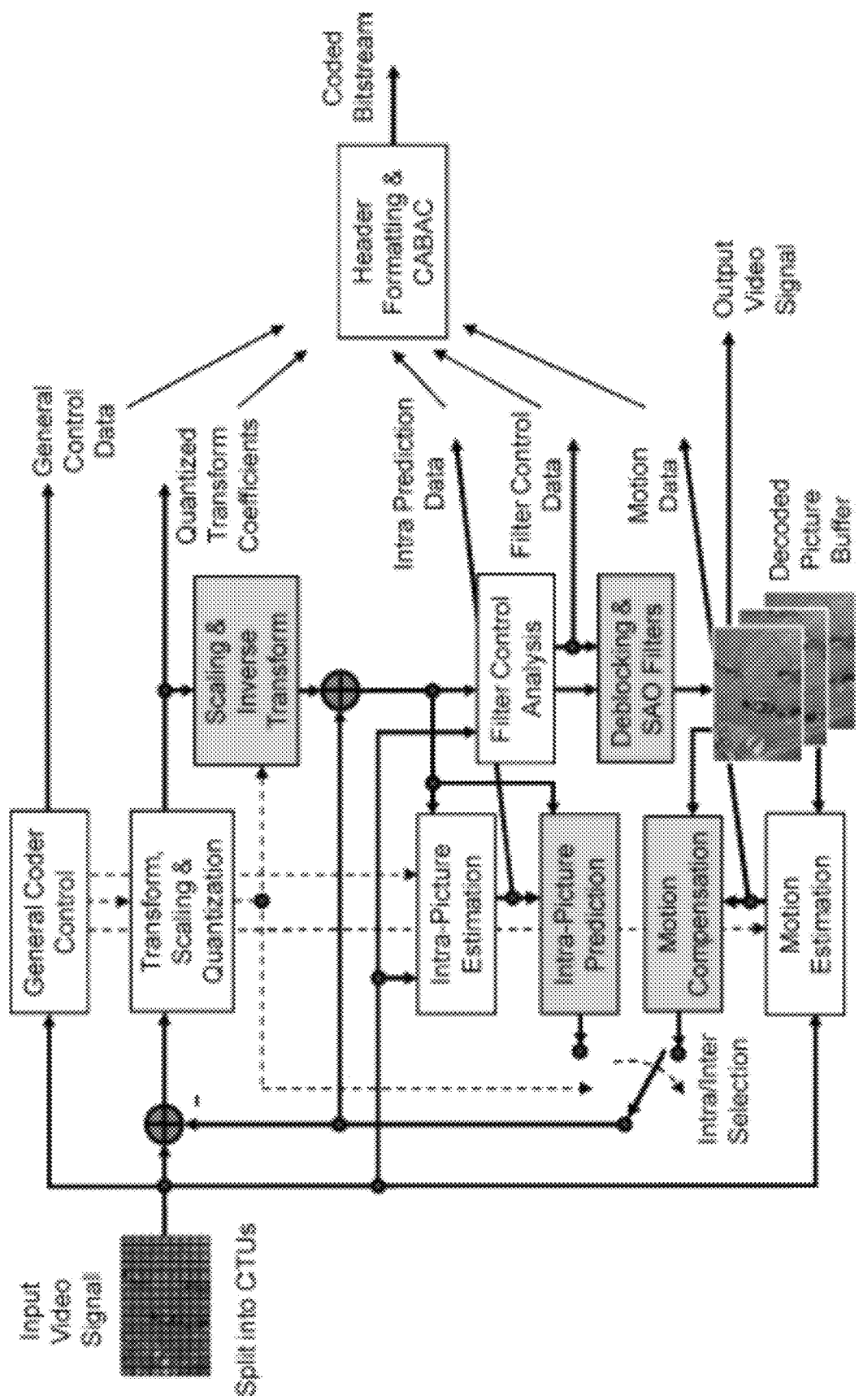
FIG. 12 shows a block diagram of an example implementation of a video encoder.

FIG. 12 is a block diagram of an example implementation of a video encoder.

2.1 Partition Tree Structure in H.264/AVC

Partition tree structure in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4 (see FIG. 2). Only one motion vector (MV) per sub-macroblock partition is allowed.

Figure 1:
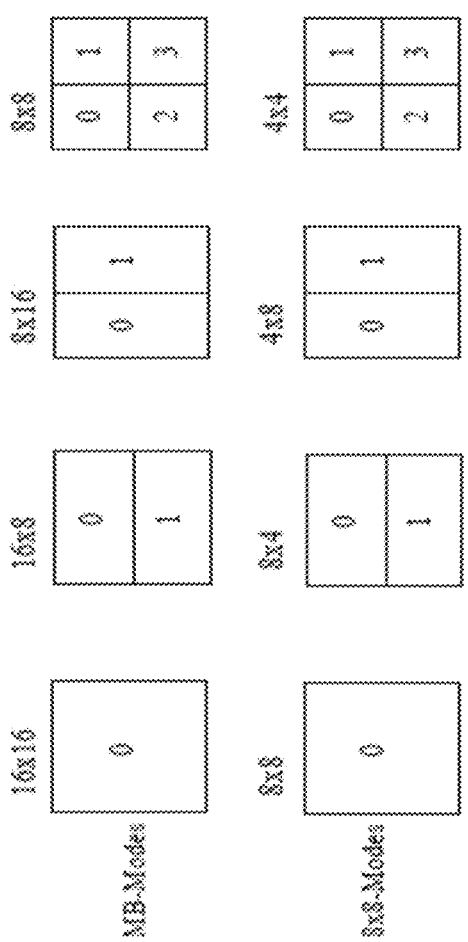
FIG. 1 is an illustration of MB partitions in H.264/Advanced Video Coding (AVC).

FIG. 1 is an illustration of MB partitions in H.264/Advanced Video Coding (AVC).

2.1.2 Partition Tree Structure in HEVC

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

In the following, the various features involved in hybrid video coding using HEVC are highlighted as follows.

1) Coding tree units and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

Figure 3B:
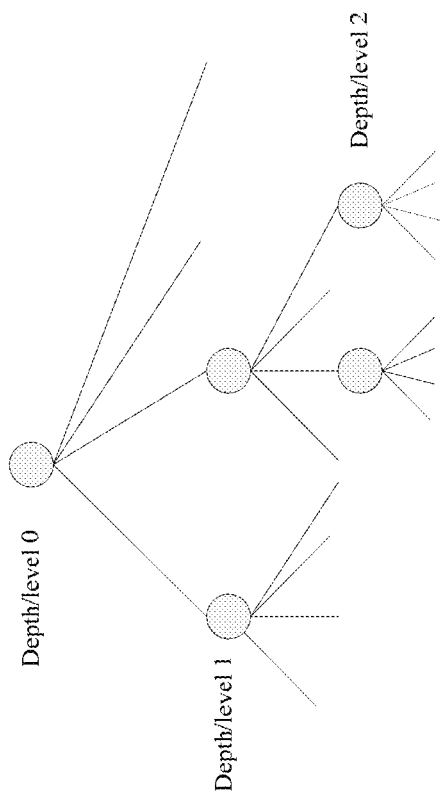
FIGS. 3A-3B show examples of subdivision of a coding tree block (CTB) into CBs.
Figure 3A:
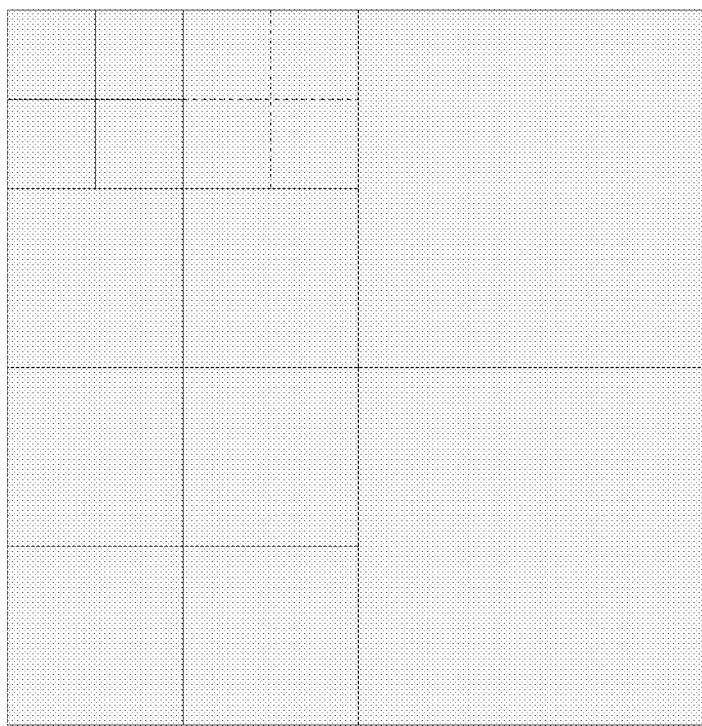

3) Prediction units and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. FIGS. 3A-3B shows examples of allowed PBs for a M×M CU.

Figure 2:
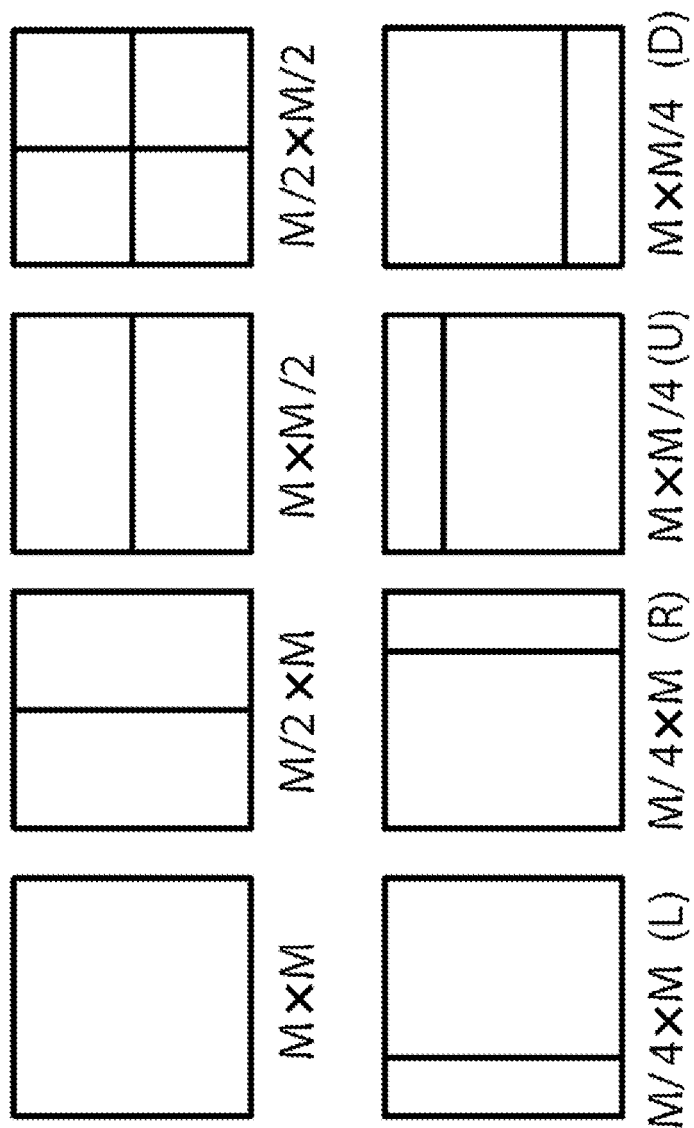
FIG. 2 shows examples of modes for splitting a coding block (CB) into prediction blocks (PBs).

FIG. 2 shows examples of modes for splitting a coding block (CB) into prediction blocks (PBs).

4) TUs and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

FIGS. 3A-3B shows an example of subdivision of a coding tree block (CTB) into CBs.

2.1.2.1 Tree-Structured Partitioning into Transform Blocks and Units

For residual coding, a CB can be recursively partitioned into transform blocks (TBs). The partitioning is signaled by a residual quadtree. Only square CB and TB partitioning is specified, where a block can be recursively split into quadrants, as illustrated in FIGS. 4A-4B. For a given luma CB of size M×M, a flag signals whether it is split into four blocks of size M/2×M/2. If further splitting is possible, as signaled by a maximum depth of the residual quadtree indicated in the SPS, each quadrant is assigned a flag that indicates whether it is split into four quadrants. The leaf node blocks resulting from the residual quadtree are the transform blocks that are further processed by transform coding. The encoder indicates the maximum and minimum luma TB sizes that it will use. Splitting is implicit when the CB size is larger than the maximum TB size. Not splitting is implicit when splitting would result in a luma TB size smaller than the indicated minimum. The chroma TB size is half the luma TB size in each dimension, except when the luma TB size is 4×4, in which case a single 4×4 chroma TB is used for the region covered by four 4×4 luma TBs. In the case of intra-picture-predicted CUs, the decoded samples of the nearest-neighboring TBs (within or outside the CB) are used as reference data for intra picture prediction.

In contrast to previous standards, the HEVC design allows a TB to span across multiple PBs for inter-picture predicted CUs to maximize the potential coding efficiency benefits of the quadtree-structured TB partitioning.

2.1.2.2 Parent and Child Nodes

A CTB is divided according to a quad-tree structure, the nodes of which are coding units. The plurality of nodes in a quad-tree structure includes leaf nodes and non-leaf nodes. The leaf nodes have no child nodes in the tree structure (i.e., the leaf nodes are not further split). The, non-leaf nodes include a root node of the tree structure. The root node corresponds to an initial video block of the video data (e.g., a CTB). For each respective non-root node of the plurality of nodes, the respective non-root node corresponds to a video block that is a sub-block of a video block corresponding to a parent node in the tree structure of the respective non-root node. Each respective non-leaf node of the plurality of non-leaf nodes has one or more child nodes in the tree structure.

2.1.3 Quadtree Plus Binary Tree Block Structure with Larger CTUs in JEM

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

2.1.3.1 QTBT Block Partitioning Structure

Figure 5:
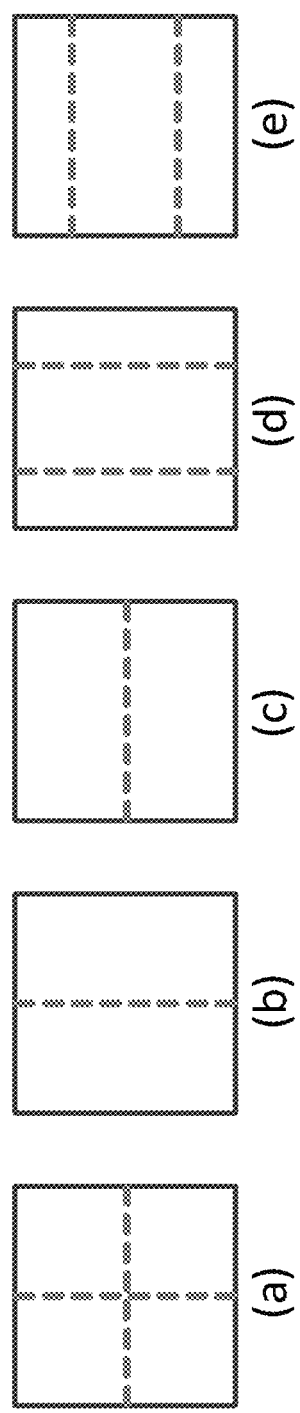
FIG. 5 shows examples of partitioning.

Different from HEVC, the QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIG. 5, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.

CTU size: the root node size of a quadtree, the same concept as in HEVC

MinQTSize: the minimally allowed quadtree leaf node size

MaxBTSize: the maximally allowed binary tree root node size

MaxBTDepth: the maximally allowed binary tree depth

MinBTSize: the minimally allowed binary tree leaf node size

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

FIG. 4A illustrates an example of block partitioning by using QTBT, and FIG. 4B illustrates the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

2.1.4 Ternary-Tree for VVC

Tree types other than quad-tree and binary-tree can be supported. In the implementation, two more ternary tree (TT) partitions, i.e., horizontal and vertical center-side ternary-trees are introduced, as shown in FIGS. 5 (*d*) and (*e*).

FIG. 5 shows examples of partitioning: (a) quad-tree partitioning (b) vertical binary-tree partitioning (c) horizontal binary-tree partitioning (d) vertical center-side ternary-tree partitioning (e) horizontal center-side ternary-tree partitioning.

In [6], there are two levels of trees, region tree (quad-tree) and prediction tree (binary-tree or ternary-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

2.2 Post-Reconstruction Filtering 2.2.1 Bilateral Filter in the JEM

The bilateral filter is the first loop filter in the decoding process chain of the JEM. Just after a TU is reconstructed, each luma sample in the reconstructed TU is replaced by a weighted average of itself and its neighbours within the TU. The weights are calculated based on the distance from the center sample as well as the difference in sample values. Accordingly, the disclosed bilateral filter is based on sample intensity values of neighboring samples. A reconstructed TU is referred to herein as a reconstructed representation of a portion of video data and/or a reconstructed representation of one or more video sample(s). The filter shape is a small plus sign as shown in FIG. 6.

Figure 6:
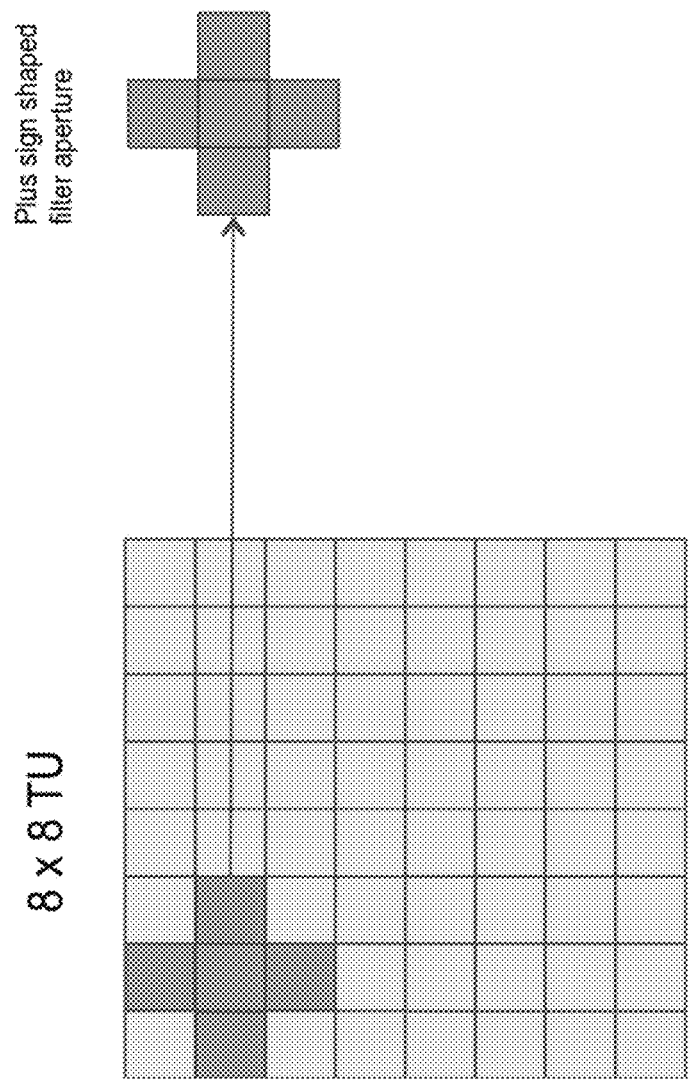
FIG. 6 shows an example of a transform unit (TU) and a filter aperture.

FIG. 6 shows an example of a transform unit (TU) and a filter aperture. For example, FIG. 6 shows an example of an 8×8 TU block and the filter aperture for the sample located at position (1,1).

The bilateral filter works by basing the filter weights not only on the distance to neighbouring samples but also on their values. A sample located at (i, j), is filtered using its neighbouring sample (k, l). The weight ω(i, j, k, l) is the weight assigned for sample (k, l) to filter the sample (i, j), and it is defined as $$\omega(i, j, k, l) = e^{\left(-\frac{(i-k)^2+(j-l)^2}{2\sigma_d^2} - \frac{\|I(i,j)-I(k,l)\|^2}{2\sigma_r^2}\right)} \quad (1)$$

Here, I(i, j) and I (k, l) are the original reconstructed intensity value of samples (i, j) and (k, l) respectively. $\sigma_d$ is the spatial parameter, and $\sigma_r$ is the range parameter. The properties (or strength) of the bilateral filter are controlled by these two parameters. Samples located closer to the sample to be filtered, and samples having smaller intensity difference to the sample to be filtered, will have a larger weight than samples further away and with larger intensity difference. In the JEM, $\sigma_d$ is set dependent on the transform unit size and prediction mode, and $\sigma_r$ is set based on the QP used for the current block.

$$\sigma_d = 0.92 - \frac{\min(TU \text{ block width}, TU \text{ block height})}{40}, \text{ for intra blocks} \quad (2)$$

$$\sigma_d = 0.72 - \frac{\min(TU \text{ block width}, TU \text{ block height})}{40}, \text{ for inter blocks} \quad (3)$$

$$\sigma_r = \max\left(\frac{QP - 17}{2}, 0.01\right). \quad (4)$$

The different values for $\sigma_d$ means that filter strength for inter prediction blocks is relatively weaker compared to that of intra prediction blocks. Inter predicted blocks typically have less residual than intra predicted blocks and therefore the bilateral filter is designed to filter the reconstruction of inter predicted blocks less. Thus, a strength of the bilateral filter can be based on a coding mode or a coding condition of a block (or, portion) of video.

The output filtered sample value $I_D(i, j)$ is calculated as:

$$I_F(i, j) = \frac{\sum_{k,l} I(k, l) * \omega(i, j, k, l)}{\sum_{k,l} \omega(i, j, k, l)} \quad (5)$$

Due to the fact that the filter only touches the sample and its 4-neighbours, this equation can be written as $$I_F = \frac{I_C \omega_C + I_L \omega_L + I_R \omega_R + I_A \omega_A + I_B \omega_B}{\omega_C + \omega_L + \omega_R + \omega_A + \omega_B} \quad (6)$$

where $I_C$ is the intensity of the center sample, and $I_L$, $I_R$, $I_A$ and $I_B$ are the intensities for the left, right, above and below samples, respectively. Likewise, $\omega_C$ is the weight for the center sample, and $\omega_L$, $\omega_R$, $\omega_A$ and $\omega_B$ are the corresponding weights for the neighbouring samples. The filter only uses samples within the block for filtering—weights outside are set to 0.

In order to reduce the number of calculations, the bilateral filter in the JEM has been implemented using a look-up-table (LUT). For every QP, there is a one-dimensional LUT for the values $\omega_L$, $\omega_R$, $\omega_A$ and $\omega_B$ where the value $$\omega_{other} = \text{round}\left(65 * e^{\left(-\frac{1}{2*0.82^2}\frac{\|I-I_C\|^2}{2\sigma_r^2}\right)}\right) \quad (7)$$

is stored, where $\sigma_r^2$ is calculated from Equation 4 depending upon QP. Since $$\sigma_d = 0.92 - \frac{4}{40} = 0.82$$

in the LUT, it can be used directly for the intra 4×4 case with a center weight $\omega_C$ of 65, which represents 1.0. For the other modes, we use the same LUT, but instead use a center weight of $$\omega_C = \text{round}\left(65 * \frac{e^{-\frac{1}{2*0.82^2}}}{e^{-\frac{1}{2*\sigma_d^2}}}\right), \quad (8)$$

where $\sigma_d$ is obtained by Equation 2 or 3. The final filtered value is calculated as $$I_F = \text{floor}\left(\frac{\begin{array}{c}I_C\omega_C + I_L\omega_L + I_R\omega_R + I_A\omega_A + \\ I_B\omega_B + ((\omega_C + \omega_L + \omega_R + \omega_A + \omega_B) \gg 1)\end{array}}{\omega_C + \omega_L + \omega_R + \omega_A + \omega_B}\right) \quad (9)$$

where the division used is integer division and the term $(\omega_C+\omega_L+\omega_R+\omega_A+\omega_B)\gg 1$ is added to get correct rounding.

In the JEM reference software, the division operation in Equation 9 is replaced by LUT, multiplication and shift operations. To reduce the size of the numerator and denominator, Equation 9 is further refined to $$I_F = I_C + \frac{\omega_L(I_L - I_C) + \omega_R(I_R - I_C) + \omega_A(I_A - I_C) + \omega_B(I_B - I_C)}{\omega_C + \omega_L + \omega_R + \omega_A + \omega_B} \quad (10)$$

In the JEM reference software, Equation 10 is implemented in a way so that it is bit exact to Equation 9. Using Equation 9 as is, (i.e., with the division operation) provides the same results as the division-free implementation in the JEM.

The filter is turned off if QP<18 or if the block is of inter type and the block dimensions are 16×16 or larger.

2.2.2 Non-Local Non-Division Bilateral Filter

The proposed bilateral filter can be applied to luma blocks with non-zero transform coefficients and slice quantization parameter larger than 17. Therefore, there is no need to signal the usage of the bilateral filter. Bilateral filter, if applied, is performed on decoded samples right after the inverse transform. In addition, the filter parameters, i.e., weights are explicitly derived from the coded information.

The filtering process is defined as:

$$P'_{0,0} = P_{0,0} + \Sigma_{k=1}^K W_k(P_{k,0} - P_{0,0}) \times (P_{k,0} - P_{0,0})) \quad (11)$$

where $P_{0,0}$ is the intensity of the current sample and $N_0$ is the modified intensity of the current sample, $P_{k,0}$ and $\omega_k$ are the intensity and weighting parameter for the k-th neighboring sample, respectively. An example of one current sample and its four neighboring samples (i.e., K=4) is depicted in 7.

Figure 7:
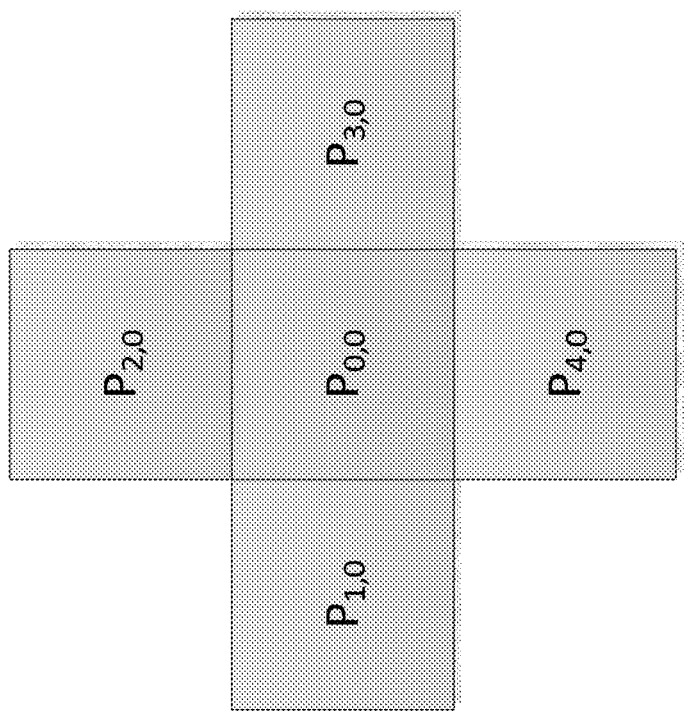
FIG. 7 shows an example of neighboring samples used in a bilateral filter.

FIG. 7 shows an example of neighboring samples used in a bilateral filter.

More specifically, the weight $\omega_k(x)$ associated with the k-th neighboring sample is defined as follows:

$$W_k(x) = Distance_k \times Range_k(x) \quad (12)$$

$$\text{wherein } Distance_k = e^{\left(-\frac{10000}{2\sigma_d^2}\right)} \Big/ 1 + 4 * e^{\left(-\frac{10000}{2\sigma_d^2}\right)}$$

$$Range_k(x) = e^{\left(-\frac{x^2}{8*(QP-17)*(QP-17)}\right)}$$

and $\sigma_d$ is dependent on the coded mode and coding block sizes. The described filtering process is applied to intra-coded blocks, and inter-coded blocks when TU is further split, to enable parallel processing.

To further improve the coding performance, for inter-coded blocks when TU is not split, the intensity difference between current sample and one of its neighboring samples is replaced by a representative intensity difference between two windows covering current sample and the neighboring sample. Therefore, the equation of filtering process is revised to:

$$P'_{0,0} = P_{0,0} + \sum_{k=1}^{N} W_k \left( \frac{1}{M} \sum_{m=-M/2}^{M/2} \text{abs}(P_{k,m} - P_{0,m}) \right) \times (P_{k,0} - P_{0,0}) \quad (13)$$

wherein $P_{k,m}$ and $P_{0,m}$ represent the m-th sample value within the windows centered at $P_{k,0}$ and $P_{0,0}$, respectively. In this proposal, the window size is set to 3×3. An example of two windows covering $P_{2,0}$ and $P_{0,0}$ are depicted in FIG. 8.

Figure 8:
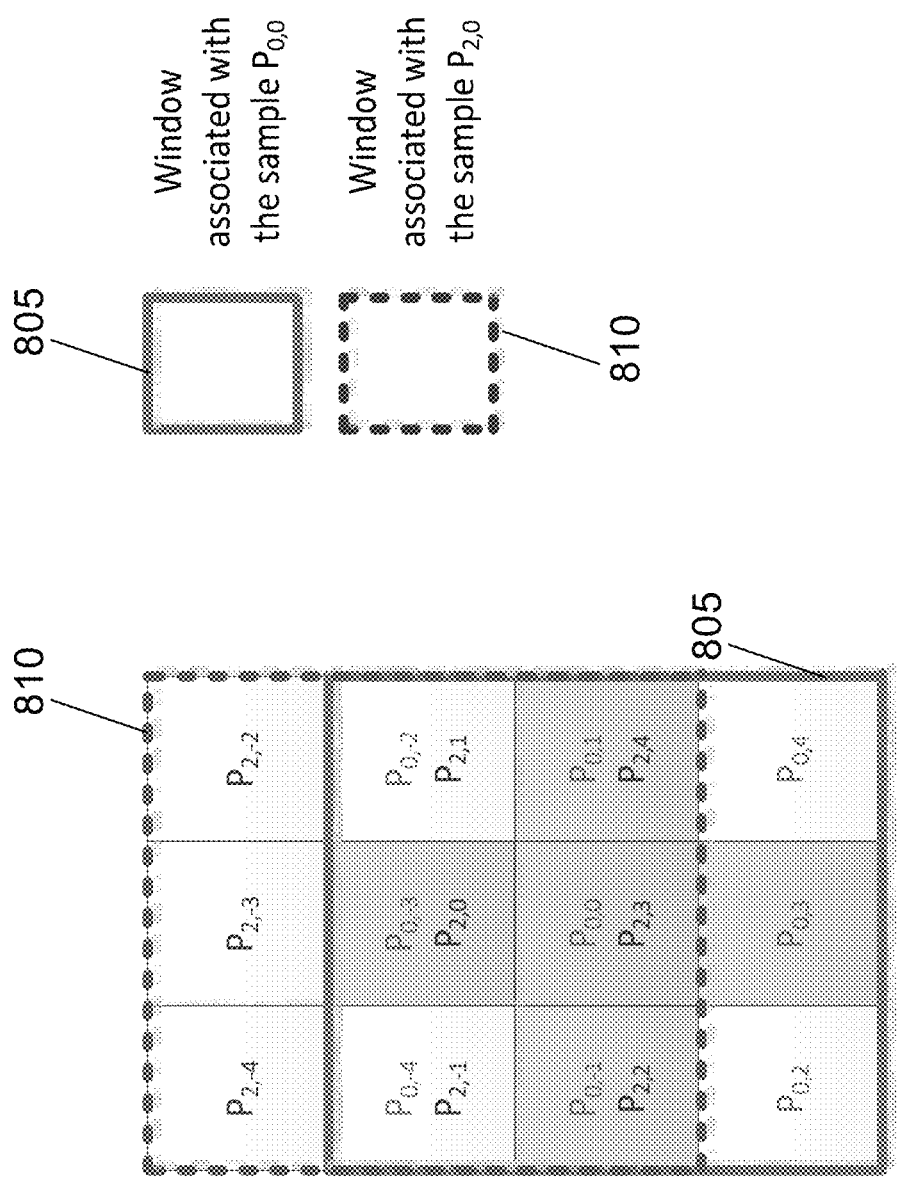
FIG. 8 shows windows covering two samples utilized in a weight calculation.

FIG. 8 shows windows 805 (as indicated by the solid line) and 810 (as indicated by the dotted line) covering two samples utilized in a weight calculation.

2.3 Quantization Parameters

In some implementations, the maximum allowed quantization parameter (QP) is modified from 51 as in HEVC/H.265 to 63. The modifications are based on HEVC ISO/IEC 23008-2, ITU-T H.265. The changes to the current version of the technical standards in view of the increased range of QPs are shown in bold and italicized text below.

7.3.2.3 Picture Parameter Set RBSP Syntax 7.3.2.3.1 General Picture Parameter Set RBSP Syntax

|  | Descriptor |
| --- | --- |
| pic_parameter_set_rbsp( ) { |  |
|   pps_pic_parameter_set_id | ue(v) |
|   pps_seq_parameter_set_id | ue(v) |
|   dependent_slice_segments_enabled_flag | u(1) |
|   output_flag_present_flag | u(1) |
|   num_extra_slice_header_bits | u(3) |
|   sign_data_hiding_enabled_flag | u(1) |
|   cabac_init_present_flag | u(1) |
|   num_ref_idx_l0_default_active_minus1 | ue(v) |
|   num_ref_idx_l1_default_active_minus1 | ue(v) |
|   init_qp_minus26 | se(v) |
|   constrained_intra_pred_flag | u(1) |
|   transform_skip_enabled_flag | u(1) |
|   cu_qp_delta_enabled_flag | u(1) |
|   if( cu_qp_delta_enabled_flag ) |  |
|     diff_cu_qp_delta_depth | ue(v) |
|   pps_cb_qp_offset | se(v) |
|   pps_cr_qp_offset | se(v) |
|   pps_slice_chroma_qp_offsets_present_flag | u(1) |
|   weighted_pred_flag | u(1) |
|   weighted_bipred_flag | u(1) |
|   transquant_bypass_enabled_flag | u(1) |
|   tiles_enabled_flag | u(1) |
|   entropy_coding_sync_enabled_flag | u(1) |
|   ... |  |
|   rbsp_trailing_bits( ) |  |
| } |  |

7.4.3.3.1 General picture parameter set RBSP semantics

...

init_qp_minus26 plus 26 specifies the initial value of $SliceQp_Y$ for each slice referring to the PPS. The initial value of $SliceQp_Y$ is modified at the slice segment layer when a non-zero value of slice_qp_delta is decoded. The value of init_qp_minus26 shall be in the range of −(26+QpBdOffsety) to +37 (instead of 25, as in the current version of the standard), inclusive.

cu_qp_delta_enabled_flag equal to 1 specifies that the diff_cu_qp_delta_depth syntax element is present in the PPS and that cu_qp_delta_abs may be present in the transform unit syntax and the palette syntax. cu_qp_delta_enabled_flag equal to 0 specifies that the diff_cu_qp_delta_depth syntax element is not present in the PPS and that cu_qp_delta_abs is not present in the transform unit syntax and the palette syntax.

diff_cu_qp_delta_depth specifies the difference between the luma coding tree block size and the minimum luma coding block size of coding units that convey cu_qp_delta_abs and cu_qp_delta_sign_flag. The value of diff_cu_qp_delta_depth shall be in the range of 0 to log 2_diff_max_min_luma_coding_block_size, inclusive. When not present, the value of diff_cu_qp_delta_depth is inferred to be equal to 0.

The variable Log 2MinCuQpDeltaSize is derived as follows:

Log 2MinCuQpDeltaSize=CtbLog 2SizeY−diff_cu_qp_delta_depth    (7-36)

pps_cb_qp_offset and pps_cr_qp_offset specify the offsets to the luma quantization parameter $Qp'_Y$ used for deriving $Qp'_{Cb}$ and $Qp'_{Cr}$, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value.

pps_slice_chroma_qp_offsets_present_flag equal to 1 indicates that the slice_cb_qp_offset and slice_cr_qp_offset syntax elements are present in the associated slice headers. pps_slice_chroma_qp_offsets_present_flag equal to 0 indicates that these syntax elements are not present in the associated slice headers. When ChromaArrayType is equal to 0, pps_slice_chroma_qp_offsets_present_flag shall be equal to 0.

7.4.7.1 General Slice Segment Header Semantics

...

slice_qp_delta specifies the initial value of $Qp_Y$ to be used for the coding blocks in the slice until modified by the value of CuQpDeltaVal in the coding unit layer. The initial value of the $Qp_Y$ quantization parameter for the slice, $SliceQp_Y$, is derived as follows:

$SliceQp_Y$=26+init_qp_minus26+slice_qp_delta    (7-54)

The value of $SliceQp_Y$ shall be in the range of −QpBdOffsety to +63 (instead of 51, as in the current version of the standard), inclusive.

7.4.9.14 Delta QP semantics

...

When cu_qp_delta_abs is present, the variables IsCuQpDeltaCoded and CuQpDeltaVal are derived as follows:

IsCuQpDeltaCoded=1  (7-87)

CuQpDeltaVal=cu_qp_delta_abs*(1−2*cu_qp_delta_sign_flag)  (7-88)

The value of CuQpDeltaVal shall be in the range of −(32+QpBdOffsetY/2) to +(31+QpBdOffsetY/2), inclusive. Note that the current version of the standard uses "26" instead of 32 and "25" instead of 31.

8.6.1 Derivation Process for Quantization Parameters

. . .

4. The predicted luma quantization parameter $qP_{Y\_PRED}$ is derived as follows:

$qP_{Y\_PRED}=(qP_{Y\_A}+qP_{Y\_B}+1)>>1$  (8-284)

The variable $Qp_Y$ is derived as follows:

$Qp_Y=((qP_{Y\_PRED}+CuQpDeltaVal+64+2*QpBdOffset_Y)\%(64+QpBdOffsety))-QpBdOffsety$  (8-285)

The current version of the standard uses "52" instead of 64 in both places above.
The luma quantization parameter $Qp'_Y$ is derived as follows:

$Qp'_Y=Qp_Y+QpBdOffset_Y$  (8-286)

When ChromaArrayType is not equal to 0, the following applies:
  The variables $qP_{Cb}$ and $qP_{Cr}$ are derived as follows:
    If tu_residual_act_flag[xTbY][yTbY] is equal to 0, the following applies:

$qPi_{Cb}=Clip3(-QpBdOffsetc,69,QpY+pps\_cb\_qp\_offset+slice\_cb\_qp\_offset+CuQ pOffsetCb)$  (8-287)

$qPiCr=Clip3(-QpBdOffsetC,69,QpY+pps\_cr\_qp\_offset+slice\_cr\_qp\_offset+Cu QpOffsetCr)$  (8-288)

Otherwise (tu_residual_actjlag[xTbY][yTbY] is equal to 1), the following applies:

$qPiCb=Clip3(-QpBdOffsetC,69,QpY+PpsActQpOffsetCb+slice\_act\_cb\_qp\_offset+CuQpOffsetCb)$  (8-289)

$qPiCr=Clip3(-QpBdOffsetC,69,QpY+PpsActQpOffsetCr+slice\_act\_cr\_qp\_offset+CuQpOffsetCr)$  (8-290)

Note that the current version of the standard uses "57" instead of 69 in the above four equations.
If ChromaArrayType is equal to 1, the variables $qP_{Cb}$ and $qP_{Cr}$ are set equal to the value of $Qp_C$ as specified in Table 8-10 based on the index qPi equal to $qPi_{Cb}$ and $qPi_{Cr}$, respectively.
Otherwise, the variables $qP_{Cb}$ and $qP_{Cr}$ are set equal to Min(qPi,63), based on the index qPi equal to $qPi_{Cb}$ and $qPi_{Cr}$, respectively. Note that the current version of the standard uses "51" instead of 63.
The chroma quantization parameters for the Cb and Cr components, $Qp'_{Cb}$ and $Qp'_{Cr}$, are derived as follows:

$Qp'_{Cb}=qP_{Cb}+QpBdOffset_C$  (8-291)

$Qp'_{Cr}=qP_{Cr}+QpBdOffset_C$  (8-292)

TABLE 8-10

Specification of $Qp_C$ as a function of qPi for ChromaArrayType equal to 1

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $Qp_C$ | =qPi | 29 | 30 | 31 | 32 | 33 | 33 | 34 | 34 | 35 | 35 | 36 | 36 | 37 | 37 | =qPi − 6 |

8.7.2.5.3 Decision Process for Luma Block Edges

. . .

The variable $qP_L$ is derived as follows:

$qP_L=((Qp_Q+Qp_P+1)>>1)$  (8-349)

The value of the variable β' is determined as specified in Table 8-12 based on the luma quantization parameter Q derived as follows:

$Q=Clip3(0,63,qP_L+(slice\_beta\_offset\_div2<<1))$  (8-350)

where slice_beta_offset_div2 is the value of the syntax element slice_beta_offset_div2 for the slice that contains sample $q_{0,0}$. Note that the current version of the standard uses "51" instead of 63.
The variable β is derived as follows:

$β=β'*(1<<(BitDepth_Y-8))$  (8-351)

The value of the variable $t_C'$ is determined as specified in Table 8-12 based on the luma quantization parameter Q derived as follows:

$Q=Clip3(0,65,qP_L+2*(bS-1)+(slice\_tc\_offset\_div2>>1))$  (8-352)

where slice_tc_offset_div2 is the value of the syntax element slice_tc_offset_div2 for the slice that contains sample $q_{0,0}$. Note that the current version of the standard uses "53" instead of 65.
The variable $t_C$ is derived as follows:

$t_C=t_C'*(1<<(BitDepth_Y-8))$  (8-353)

. . .

TABLE 8-12

Derivation of threshold variables β' and $t_C'$ from input Q

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| β' | 0 | 0 | 0 | 0 | 0 | 0 | 0 | 0 | 0 | 0 | 0 | 0 | 0 | 0 | 0 | 0 | 6 | 7 | 8 |
| $t_C'$ | 0 | 0 | 0 | 0 | 0 | 0 | 0 | 0 | 0 | 0 | 0 | 0 | 0 | 0 | 0 | 0 | 0 | 0 | 1 |

TABLE 8-12-continued

Derivation of threshold variables β' and $t_C'$ from input Q

| Q | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|
| β' | 9 | 10 | 11 | 12 | 13 | 14 | 15 | 16 | 17 | 18 | 20 | 22 | 24 | 26 | 28 | 30 | 32 | 34 | 36 |
| $t_C'$ | 1 | 1 | 1 | 1 | 1 | 1 | 1 | 1 | 2 | 2 | 2 | 2 | 3 | 3 | 3 | 3 | 4 | 4 | 4 |
| Q | 38 | 39 | 40 | 41 | 42 | 43 | 44 | 45 | 46 | 47 | 48 | 49 | 50 | 51 | 52 | 53 | 54 | 55 | 56 |
| β' | 38 | 40 | 42 | 44 | 46 | 48 | 50 | 52 | 54 | 56 | 58 | 60 | 62 | 64 | 66– | 68– | 70 | 72 | 74 |
| $t_C'$ | 5 | 5 | 6 | 6 | 7 | 8 | 9 | 10 | 11 | 13 | 14 | 16 | 18 | 20 | 22 | 24 | 26 | 28 | 30 |

| Q | 57 | 58 | 59 | 60 | 61 | 62 | 63 | 64 | 65 |
|---|---|---|---|---|---|---|---|---|---|
| β' | 76 | 78 | 80 | 82 | 84 | 86 | 88 | — | — |
| $t_C'$ | 32 | 34 | 36 | 38 | 40 | 42 | 44 | 46 | 48 |

8.7.2.5. Filtering Process for Chroma Block Edges

. . .

If ChromaArrayType is equal to 1, the variable $Qp_C$ is determined as specified in Table 8-10 based on the index qPi derived as follows:

$$qPi=((Qp_Q+Qp_P+1)>>1)+cQpPicOffset \quad (8\text{-}384)$$

Otherwise (ChromaArrayType is greater than 1), the variable $Qp_C$ is set equal to Min(qPi, 63). NOTE—The variable cQpPicOffset provides an adjustment for the value of pps_cb_qp_offset or pps_cr_qp_offset, according to whether the filtered chroma component is the Cb or Cr component. However, to avoid the need to vary the amount of the adjustment within the picture, the filtering process does not include an adjustment for the value of slice_cb_qp_offset or slice_cr_qp_offset, nor (when chroma_qp_offset_list_enabled_flag is equal to 1) for the value of $CuQpOffset_{Cb}$ or $CuQpOffset_{Cr}$.

The value of the variable $t_C'$ is determined as specified in Table 8-12 based on the chroma quantization parameter Q derived as follows:

$$Q=\text{Clip3}(0,65,Qp_C+2+(slice\_tc\_offset\_div2<<1)) \quad (8\text{-}385)$$

where slice_tc_offset_div2 is the value of the syntax element slice_tc_offset_div2 for the slice that contains sample $q_{0,0}$. Note that the current version of the standard uses "51" instead of 63 and "53" instead of 65.

9.3.2.2 Initialization Process for Context Variables

The two values assigned to pStateIdx and valMps for the initialization are derived from $SliceQp_Y$, which is derived in Equation 7-54. Given the variables m and n, the initialization is specified as follows:

$$preCtxState=\text{Clip3}(1,126,((m*\text{Clip3}(0,63,SliceQp_Y))>>4)+n)$$

$$valMps=(preCtxState<=63)?0:1$$

$$pStateIdx=valMps?(preCtxState-64):(63-preCtxState) \quad (9\text{-}6)$$

Note that the current version of the standard uses "51" instead of 63.

3. Examples of Problems Solved by Embodiments

Bilateral filter is enabled when the slice QP is larger than 16 (larger than or equal to 17) and there are non-zero coefficients within a CU. Such a design has the following problems:

When given the certain block size, coded mode (intra or inter) and QP, the filter parameter is becoming smaller when sample difference is larger. Although after a threshold, all filter parameters will be set to 0. For sample differences smaller than the threshold, there is one-to-one mapping between a sample difference and filter parameter. So it is required to store all the parameters for each sample difference. Memory requirement is huge.

How to handle the rate control case wherein different block may use different QP is unknown.

The design of non-local bilateral filter could achieve higher coding gains, at the cost of higher computation complexity. For each sample, it requires to calculate the average sample differences within a 3×3 window with the function $$\frac{1}{M}\sum_{m=-M/2}^{M/2}\text{abs}(P_{k,m}-P_{0,m}),$$

as shown in equation (13).

The motivation of using an average sample differences between the current sample and its neighbouring sample in a 3×3 window instead of directly using the two samples' difference is that some noise may be prohibited so that more gain could be achieved. However, treating all the sample differences with the same weight doesn't consider the importance of the two samples located in the centre of a 3×3 window.

4. Examples of Embodiments

The detailed embodiments below should be considered as examples to explain general concepts. These embodiments should not be interpreted in a narrow way. Furthermore, these embodiments can be combined in any manner.

It should be noted that the methods described below may be utilized to any other filtering process which requires filter parameters dependent on quantization parameters/sample differences.

Usage of Bilateral Filters

1. Indications of enabling/disabling bilateral filters may be signaled in sequence parameter set, picture parameter set, slice header/picture header/CTUs/CTBs/group of CUs.
    a. In one example, furthermore, the signaling of indications of usage of bilateral filters may further depend on quantization parameters, minimum size of coding blocks (coding units).
    b. Alternatively, the signaling may be skipped under certain conditions, such as based on quantization parameters. For example, the signaling may be skipped if the slice quantization parameter is larger than a first threshold.
c. Alternatively, the signaling may be skipped under certain conditions, such as based on quantization parameters. For example, the signaling may be skipped if the slice quantization parameter is smaller than a second threshold.
d. The first and/or second thresholds may be pre-defined or signaled in the bitstream. In one example, the first threshold is set to 18.

2. It is proposed to automatically disable bilateral filter when the selected quantization parameter is larger than a threshold.
  a. In one example, the threshold is pre-defined or signaled in, such as sequence parameter set, picture parameter set, slice header, etc.

3. Whether to apply and how to apply bilateral filter may depend on the coding mode of the current block.
  a. In one example, bilateral filter is disabled for a CU coded with sub-block-based prediction such as affine prediction or ATMVP.
  b. Bilateral filter parameters may further depend on whether one block is coded with sub-block based prediction methods, OBMC, multi-hypothesis prediction, etc. al.
  c. In one example, bilateral filter is stronger for a CU coded with sub-block-based prediction such as affine prediction or ATMVP.
  d. In one example, bilateral filter is weaker for a CU coded with sub-block-based prediction such as affine prediction or ATMVP.
  e. In one example, bilateral filter is weaker for pixels predicted using OBMC.
  f. In one example, bilateral filter is weaker for a CU coded with multi-hypothesis prediction.

Selection of QPs

4. The QP value used in bilateral filter process for parameter derivation may be defined as:
  a. The picture level QP, e.g., the QP signaled in a PPS that current block is associated with;
  b. The slice QP that includes the current block
  c. the returned value of a function of QPs from previously coded blocks
    i. In one example, the function is defined as the average function;
    ii. In one example, the function is defined as the linear function, such as weighted average function;
    iii. In one example, the previously coded blocks indicate those which are belonging to the same CTU/the same CTU row/the same slice;
    iv. In one example, previously coded blocks cover the reference block of the current block.

Quantization of Sample Differences for Reduced Memory Size to Store Filter Parameters Denote the sample difference by $S_{Diff}$ (which could be $\|I(i,j)-I(k,l)\|$ in equation (1) or $$\frac{1}{M} \sum_{m=-M/2}^{M/2} \text{abs}(P_{k,m} - P_{0,m})$$

in equation (13)).

5. To reduce the table size for storing the related (including such as intermediate or final) parameters used in bilateral filter, the value of a parameter derived from sample difference (e.g., $\omega(i, j, k, l)$ in equation (1), or $\omega_k(x)$ in equation (12)) is not one-one mapping. That is, two or multiple sample differences may be assigned to the same weights.
  a. In one example, the same differences may be firstly quantized and the quantized value is used as an input to derive the weighting parameters used in bilateral filters.
  b. In one example, linear quantization method may be applied.
    i. In this case, instead of using $S_{Diff}$ as input, ($S_{Diff}$/stepSize) is used as input to derive bilateral filter parameters.
    ii. Alternatively, (($S_{Diff}$+offset)/stepSize) is used as input to derive bilateral filter parameters.
    iii. The parameter stepSize may be pre-defined.
    iv. The parameter stepSize may depend on QP, block size/shape/coded modes, etc. al.
  c. In one example, non-linear quantization method of the sample differences may be applied.
    i. In this case, instead of using $S_{Diff}$ as input, Quant ($S_{Diff}$, stepSize) is used as input to derive bilateral filter parameters wherein function Quant returns a quantized value by given input $S_{Diff}$ and stepSize.
    ii. Alternatively, instead of using $S_{Diff}$ as input, Quant ($S_{Diff}$) is used as input to derive bilateral filter parameters wherein function Quant returns a quantized value by a given input $S_{Diff}$.
    iii. The parameter stepSize may be pre-defined.
    iv. The parameter stepSize may depend on QP, block size/shape/coded modes/prediction methods (e.g., sub-block or non-sub-block)/motion information (e.g., affine motion or translational motion)/QP values, etc. al.
    v. The function Quant may be pre-defined.
    vi. In one example, more entries are designed for small absolute sample difference and less entries are designed for large absolute sample difference.
      1. Alternatively, furthermore, when the sample difference is larger than N or smaller than −M (N and M are positive values), one same weight is assigned.
      2. The variable N or M may further depend on coded mode information, block size/block shapes/prediction methods (e.g., sub-block or non-sub-block)/motion information (e.g., affine motion or translational motion)/QP values.

Unequal Weighted Sample Averages for Higher Coding Performance

6. Instead of using equal weights in calculation of sample difference within a window, an unequal weighted average is used instead.
  a. In one example, $$\frac{1}{M} \sum_{m=-M/2}^{M/2} \text{abs}(P_{k,m} - P_{0,m})$$

in equation (13) could be replaced by:

$$\frac{\sum_{m=-M/2}^{M/2} \text{abs}(P_{k,m} - P_{0,m}) * WA_{k,m}}{\sum_{m=-M/2}^{M/2} WA_{k,m}}$$

b. In one example, $$\frac{1}{M} \sum_{m=-M/2}^{M/2} \text{abs}(P_{k,m} - P_{0,m})$$

in equation (13) could be replaced by:

$$\frac{\sum_{m=-M/2}^{M/2} \text{abs}(P_{k,m} - P_{0,m}) * WA_m}{\sum_{m=-M/2}^{M/2} WA_m}$$

c. The unequal weights (such as $WA_{k,m}$, $WA_m$) used in sample average calculation may be pre-defined.
   i. In one example, $WA_m$ is largest when m=0 compared to other $WA_m$ when m is larger than zero.
d. The unequal weights (such as $WA_{k,m}$, $WA_m$) used in sample average calculation may further depend on QP, block size/shape/coded modes, etc. al.
e. It is noted that such methods could be applied to any bilateral filter kernels, for example, the equation (10) with sample difference replaced by sample average.

Reduced Window Size for Computational Complexity Reduction

Figure 10:
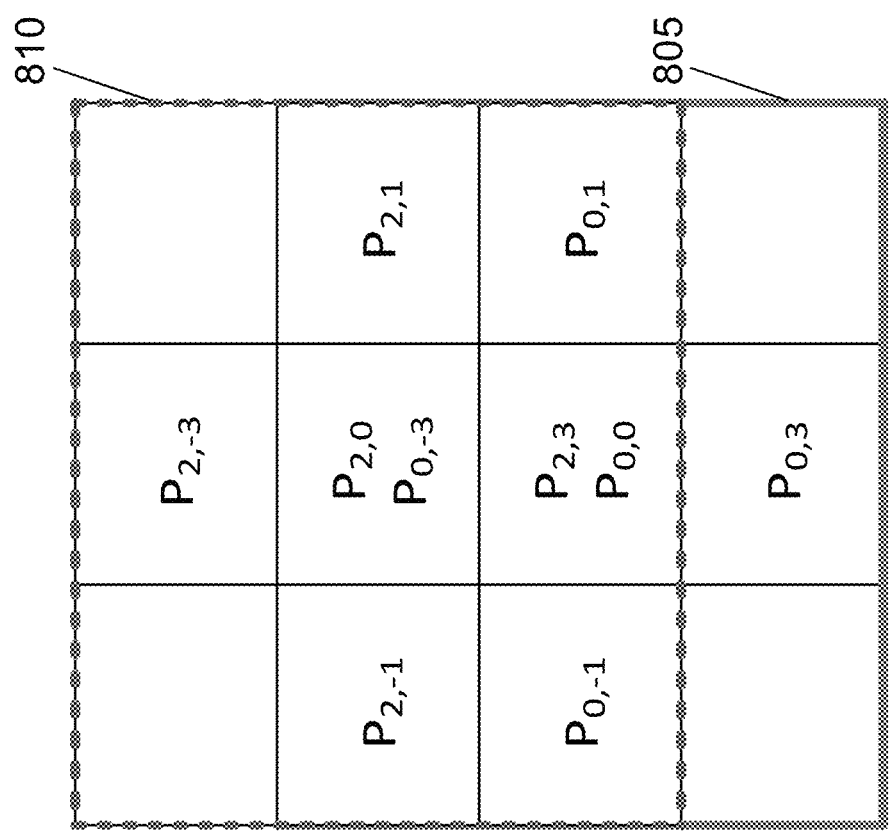
FIG. 10 shows partial samples used in a bilateral filter derivation.

7. Instead of using a N×N (e.g., N=3) window to calculate the sample average difference, only partial samples within a N×N window are utilized.
   a. In one example, the four corner samples and the center sample within the N×N window are utilized. An example is depicted in FIG. 10. And the followings may apply:
   i.

$$\frac{1}{M} \sum_{m=-M/2}^{M/2} \text{abs}(P_{k,m} - P_{0,m})$$

in equation (13) could be replaced by $1/5 \sum_{m=-(N+1)/2}^{(N+1)/2} \text{abs}(P_{k,m*2} - P_{0,m*2})$.
   b. In one example, furthermore, the unequal weighted sample average as described in bullet 5. may be further applied. For example:
   i.

$$\frac{1}{M} \sum_{m=-M/2}^{M/2} \text{abs}(P_{k,m} - P_{0,m})$$

in equation (13) could be replaced by $$\frac{1}{\sum_{m=-M/2}^{M/2} WA_{k,m}} * \left( \sum_{m=-(N+1)/2}^{(N+1)/2} \text{abs}(P_{k,m*2} - P_{0,m*2}) * WA_{k,m*2} \right).$$

ii.

$$\frac{1}{M} \sum_{m=-M/2}^{M/2} \text{abs}(P_{k,m} - P_{0,m})$$

in equation (13) could be replaced by $$\frac{1}{\sum_{m=-M/2}^{M/2} WA_{k,m}} * \left( \sum_{m=-(N+1)/2}^{(N+1)/2} \text{abs}(P_{k,m*2} - P_{0,m*2}) * WA_{m*2} \right).$$

Figure 9:
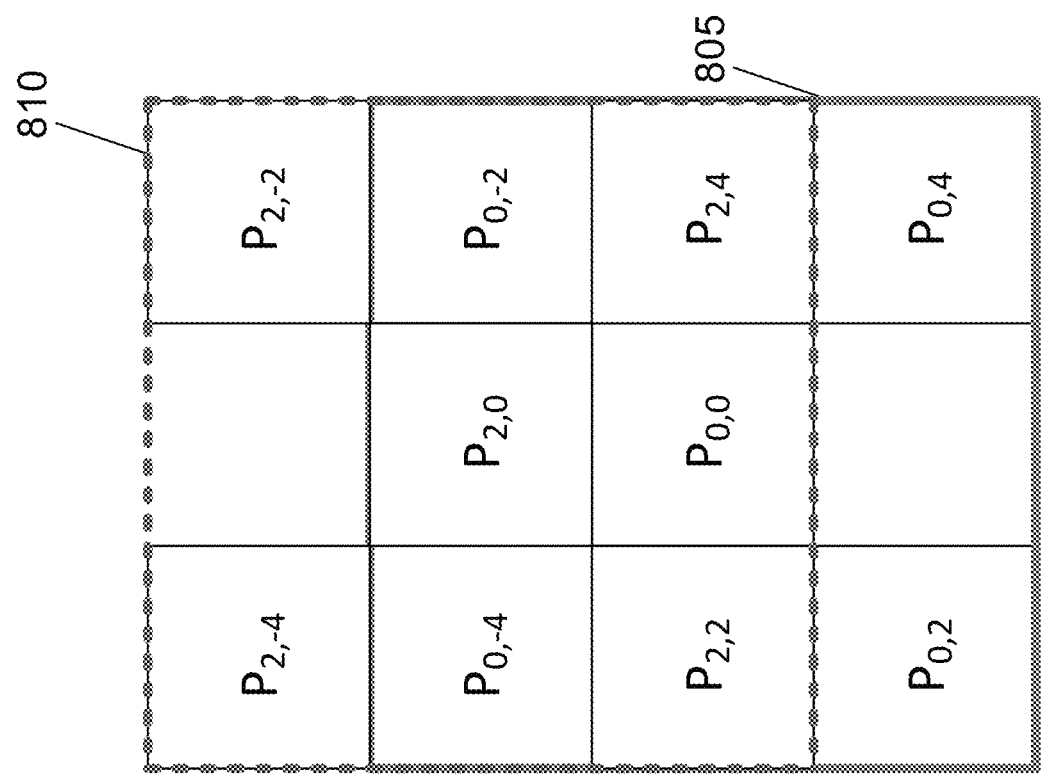
FIG. 9 shows partial samples used in a bilateral filter derivation.

FIG. 9 shows partial samples used in a bilateral filter derivation.

c. In one example, the four neighboring samples of the center sample and the center sample within the N×N window are utilized. An example is depicted in FIG. 10. And the followings may apply:
   i.

$$\frac{1}{M} \sum_{m=-M/2}^{M/2} \text{abs}(P_{k,m} - P_{0,m})$$

in equation (13) could be replaced by
   $1/5(P_{k,0}-P_{0,0}) + \sum_{m=-1}^{-1} \text{abs}(P_{k,m*2+1}-P_{0,m*2+1}) + \sum_{m=1}^{2} \text{abs}(P_{k,m*2-1}-P_{0,m*2-1}))$.
   ii.

$$\frac{1}{M} \sum_{m=-M/2}^{M/2} \text{abs}(P_{k,m} - P_{0,m})$$

in Equation (13) could be replaced by $$\frac{1}{\sum_{m=-M/2}^{M/2} WA_{k,m}} *$$

$$\left( WA_{k,0} * (P_{k,0} - P_{0,0}) + \sum_{m=-2}^{-1} WA_{k,m*2+1} * \text{abs}(P_{k,m*2+1} - P_{0,m*2+1}) + \sum_{m=1}^{2} WA_{k,m*2-1} * \text{abs}(P_{k,m*2-1} - P_{0,m*2-1}) \right).$$

iii $$\frac{1}{M} \sum_{m=-M/2}^{M/2} \text{abs}(P_{k,m} - P_{0,m})$$

in equation (13) could be replaced by $$\frac{1}{\sum_{m=-M/2}^{M/2} WA_{k,m}} * \left( WA_0 * (P_{k,0} - P_{0,0}) + \sum_{m=-2}^{-1} WA_{m*2+1} * \mathrm{abs}(P_{k,m*2+1} - P_{0,m*2+1}) + \sum_{m=1}^{2} WA_{m*2-1} * \mathrm{abs}(P_{k,m*2-1} - P_{0,m*2-1}) \right).$$

d. In one example, how to select the partial window depends on the block size, block shape, block QP, or block mode.

FIG. 10 shows an example of partial samples used in a bilateral filter derivation.

Figure 11:
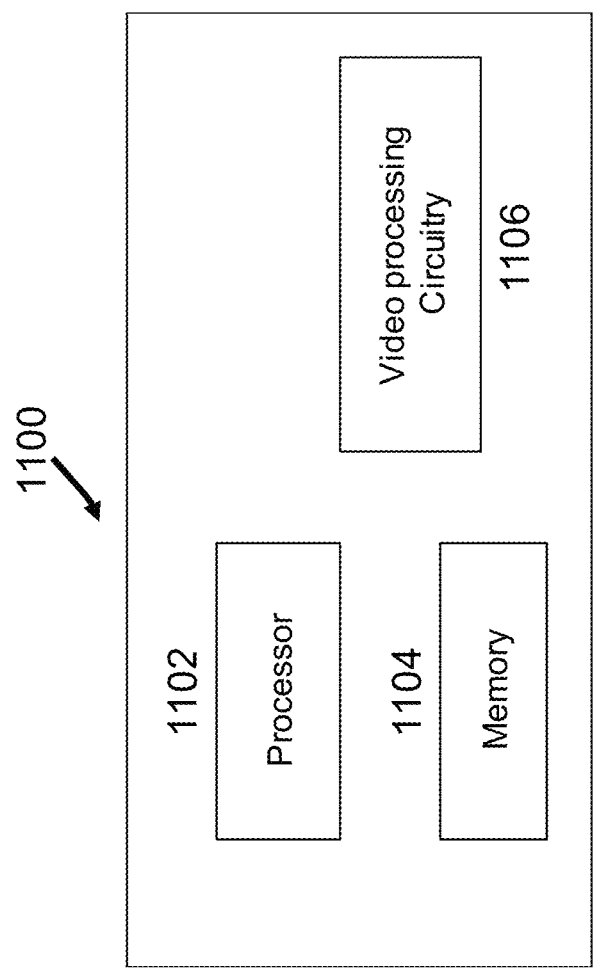
FIG. 11 is a block diagram of an example of a video processing apparatus.

FIG. 11 is a block diagram of a video processing apparatus 1100. The apparatus 1100 may be used to implement one or more of the methods described herein. The apparatus 1100 may be embodied in a smartphone, tablet, computer, Internet of Things (IoT) receiver, and so on. The apparatus 1100 may include one or more processors 1102, one or more memories 1104 and video processing hardware 1106. The processor(s) 1102 may be configured to implement one or more methods described in the present document. The memory (memories) 1104 may be used for storing data and code used for implementing the methods and techniques described herein. The video processing hardware 1106 may be used to implement, in hardware circuitry, some techniques described in the present document.

Figure 13:
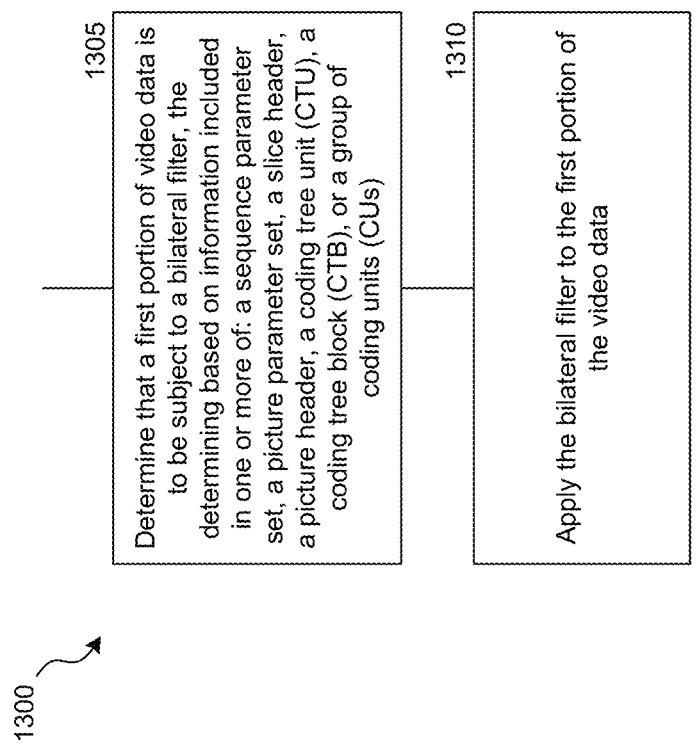
FIG. 13 is a flowchart for an example of a video bitstream processing method.

FIG. 13 is a flowchart for a method 1300 of video bitstream processing. The method 1300 includes determining (1305) that a first portion of video data is to be subject to a bilateral filter, the determining based on information included in one or more of: a sequence parameter set, a picture parameter set, a slice header, a picture header, a coding tree unit (CTU), a coding tree block (CTB), or a group of coding units (CUs), and applying (1310) the bilateral filter to the first portion of the video data.

Figure 14:
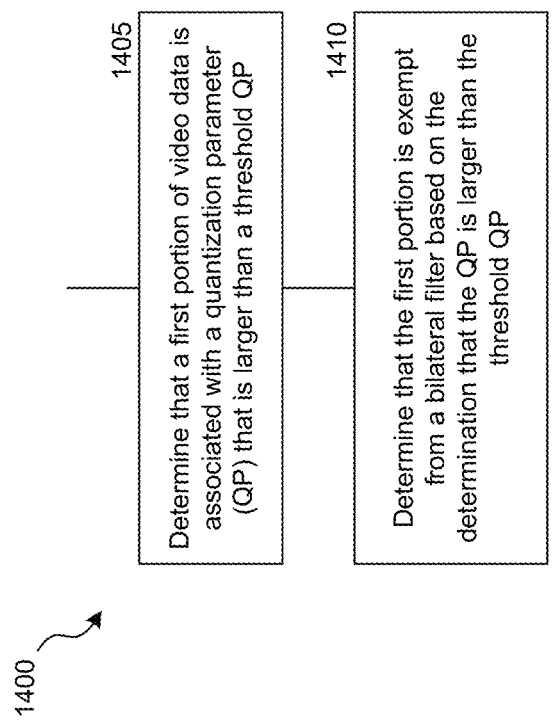
FIG. 14 is a flowchart for an example of a video bitstream processing method.

FIG. 14 is a flowchart for a method 1400 of video bitstream processing. The method 1400 includes determining (1405) that a first portion of video data is associated with a quantization parameter (QP) that is larger than a threshold QP, and determining (1410) that the first portion is exempt from a bilateral filter based on the determination that the QP is larger than the threshold QP.

Figure 15:
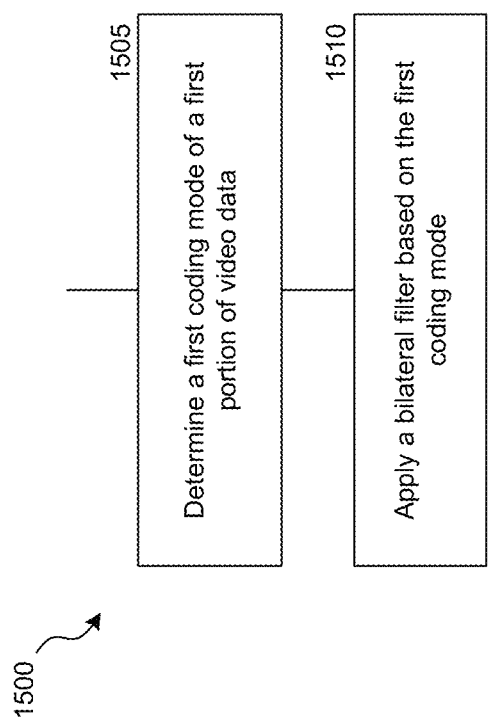
FIG. 15 is a flowchart for an example of a video bitstream processing method.

FIG. 15 is a flowchart for a method 1500 of video bitstream processing. The method 1500 includes determining (1505) a first coding mode of a first portion of video data, and applying (1510) a bilateral filter based on the first coding mode.

With reference to methods 1300, 1400, and 1500, some examples of bilateral filters and their use are described in Section 4 of the present document. For example, as described in Section 4, based on a variety of determinations can be made to determine whether or not a bilateral filter is to be applied to a portion of video data.

With reference to methods 1300, 1400, and 1500, a first portion may be encoded (or decoded) in the video bitstream in which bit efficiency may be achieved by using a bitstream generation rule related to whether the first portion should be subject to a bilateral filter.

Video data can include a picture, a slice, a tile, or other types of data that can be used to provide video content.

The methods can include determining, by the processor, one or both of: a quantization parameter (QP) of a second portion of the video data, or a minimum size of coding blocks (CBs) or CUs of the second portion of the video data; and determining, by the processor, that the second portion is exempt from the bilateral filter, wherein the determination that the first portion of the video data is to be subject to the bilateral filter is based on the determination of one or both of: the QP, or the minimum size of CBs or CUs, being exempt from the bilateral filter indicative of skipping application of the bilateral filter to the second portion.

The methods can include determining, by the processor, that a slice quantization parameter (QP) related to a second portion of the video data is larger than a threshold number; and determining, by the processor, that the second portion is exempt from the bilateral filter based on the slice QP being larger than the threshold number, being exempt from the bilateral filter indicative of skipping application of the bilateral filter to the second portion.

The methods can include determining, by the processor, that a slice quantization parameter (QP) related to a second portion of the video data is smaller than a threshold number; and determining, by the processor, that the second portion is exempt from the bilateral filter based on the slice QP being smaller than the threshold number, being exempt from the bilateral filter indicative of skipping application of the bilateral filter to the second portion.

The methods can include wherein the threshold number is provided in a bitstream related to the second portion, and wherein the threshold number is 18.

The methods can include wherein the threshold QP is defined in one or more of: a sequence parameter set, a picture parameter set, or a slice header.

The methods can include determining, by a processor, a first coding mode of a first portion of video data; and applying a bilateral filter based on the first coding mode.

The methods can include determining, by the processor, that a second coding mode of a second portion of the video data is sub-block-based prediction; and determining, by the processor, that the bilateral filter is not to be applied to the second portion based on the determination that the second coding mode is sub-block-based prediction.

The methods can include determining, by the processor, bilateral filter parameters based on the first coding mode, wherein the bilateral filter is applied in accordance with the bilateral filter parameters.

The methods can include wherein the first coding mode includes sub-block-based prediction, and wherein a strength of the bilateral filter is based on the first coding mode including sub-block-based prediction, the strength being higher than if the first coding mode does not include sub-block-based prediction.

The methods can include wherein the first coding mode includes sub-block-based prediction, and wherein a strength of the bilateral filter is based on the first coding mode including sub-block-based prediction, the strength being lower than if the first coding mode does not include sub-block-based prediction.

The methods can include wherein the first coding mode includes overlapped block motion compensation (OBMC), and wherein a strength of the bilateral filter is based on the first coding mode including OBMC, the strength being lower than if the first coding mode does not include OBMC.

The methods can include wherein the first coding mode includes multi-hypothesis prediction, and wherein a strength of the bilateral filter is based on the first coding mode including multi-hypothesis prediction, the strength being lower than if the first coding mode does not include multi-hypothesis prediction.

The methods can include wherein the application of the bilateral filter is based on a quantization parameter (QP).

The methods can include wherein the QP is based on a picture level QP of a picture that includes the first portion.

The methods can include wherein the QP is based on a slice QP of a slice that includes the first portion.

The methods can include wherein the QP is based on a returned value of a function related to QPs of other portions coded before the first portion.

The methods can include wherein the function includes an average function.

The methods can include wherein the function includes a linear function.

The methods can include wherein the other portions coded before the first portion are within a same coding tree unit (CTU), CTU row, or slice as the first portion.

The methods can include wherein the other portions coded before the first portion cover a reference portion of the first portion.

The methods can include wherein the application of the bilateral filter is based on a value of a parameter derived from a sample difference ($S_{Diff}$) that is not one-to-one mapping resulting in multiple sample differences being assigned a same weight.

The methods can include wherein the sample differences are quantized to generate a quantized value, and the quantized value is used to determine weighting samples including the same weight.

The methods can include wherein application of the bilateral filter includes a linear quantization.

The methods can include wherein the value of the parameter is further derived from $S_{Diff}$/stepSize.

The methods can include wherein stepSize is a predetermined value.

The methods can include wherein stepSize is based on one or more of: a quantization parameter (QP), a block size, a block shape, or a coding mode.

The methods can include wherein application of the bilateral filter includes a non-linear quantization.

The methods can include wherein the value of the parameter is further derived from a quant function providing a quantized value based on $S_{Diff}$ and StepSize.

The methods can include wherein the value of the parameter is further derived from a quant function providing a quantized value based on $S_{Diff}$.

The methods can include wherein stepSize is predetermined.

The methods can include wherein stepSize is based on one or more of: a quantization parameter (QP), a block size, a block shape, a coding mode, a prediction method, or motion information.

The methods can include wherein quant function is predetermined.

The methods can include more entries related to the linear quantization include small absolute sample differences than entries including large absolute sample differences.

The methods can include the same weight is assigned based on a sample difference being larger than N or smaller than −M, N and M being positive values.

The methods can include: seems incomplete?

wherein N or M are based on one or more of: coded mode information, block size, block shape, prediction method, motion information, motion information, or QP values.

The methods can include wherein the application of the bilateral filter is based on a value of a parameter derived from a sample difference ($S_{Diff}$) with unequal weighted average.

The methods can include wherein the bilateral filter is based on $$\frac{\sum_{m=-M/2}^{M/2} \text{abs}(P_{k,m} - P_{0,m}) * WA_{k,m}}{\sum_{m=-M/2}^{M/2} WA_m},$$

wherein $P_{k,m}$ is an intensity for a neighboring sample k, $WA_{k,m}$ is a weighting parameter for the neighboring sample k, and M is a sample value.

The methods can include wherein the bilateral filter is based on $$\frac{\sum_{m=-M/2}^{M/2} \text{abs}(P_{k,m} - P_{0,m}) * WA_m}{\sum_{m=-M/2}^{M/2} WA_m},$$

wherein $P_{k,m}$ is an intensity for a neighboring sample k, $WA_{k,m}$ is a weighting parameter for the neighboring sample k, and M is a sample value.

The methods can include wherein the unequal weighted average is based on unequal weights that are predetermined.

The methods can include wherein $WA_m$ is larger when m=0 than when m>0.

The methods can include wherein the unequal weighted average is based on unequal weights that are based on one or more of: a quantization parameter (QP), a block size, a shape, or a coding mode.

The methods can include wherein the method is applied to any bilateral filter kernel.

The methods can include wherein application of the bilateral filter is based on a sample window that is N×N and used to calculate a sample average difference.

The methods can include wherein the sample window is based on a center sample and four corner samples.

The methods can include wherein the bilateral filter is based on $1/5 \Sigma_{m=-(N+1)/2}^{(N+1)/2} \text{abs}(P_{k,m*2}-P_{0,m*2})$, wherein $P_{k,m}$ is an intensity for a neighboring sample k, and M is a sample value.

The methods can include wherein the application of the bilateral filter is based on a value of a parameter derived from a sample difference ($S_{Diff}$) that is not one-to-one mapping resulting in multiple sample differences being assigned a same weight.

The methods can include wherein the bilateral filter is based on $$\frac{1}{\sum_{m=-M/2}^{M/2} WA_{k,m}} * \left( \sum_{m=-(N+1)/2}^{(N+1)/2} \text{abs}(P_{k,m*2} - P_{0,m*2}) * WA_{k,m*2} \right),$$

wherein $P_{k,m}$ is an intensity for a neighboring sample k, $WA_{k,m}$ is a weighting parameter for the neighboring sample k, and M is a sample value.

The methods can include wherein the bilateral filter is based on $$\frac{1}{\sum_{m=-M/2}^{M/2} WA_{k,m}} * \left( \sum_{m=-(N+1)/2}^{(N+1)/2} \text{abs}(P_{k,m*2} - P_{0,m*2}) * WA_{m*2} \right),$$

wherein $P_{k,m}$ is an intensity for a neighboring sample k, $WA_{k,m}$ is a weighting parameter for the neighboring sample k, and M is a sample value.

The methods can include wherein application of the bilateral filter is based on the sample window having a center sample and four neighboring samples of the center sample.

The methods can include wherein the bilateral filter is based on $1/5(P_{k,0}-P_{0,0})+\Sigma_{m=-1}^{-1}\text{abs}(P_{k,m*2+1}-P_{0,m*2+1})+\Sigma_{m=1}^{2}\text{abs}(P_{k,m*2-1}-P_{0,m*2-1}))$, wherein $P_{k,m}$ is an intensity for a neighboring sample k, and M is a sample value.

The methods can include wherein the bilateral filter is based on $$\frac{1}{\sum_{m=-M/2}^{M/2} WA_{k,m}} *$$

$$\left( WA_{k,0} * (P_{k,0} - P_{0,0}) + \sum_{m=-2}^{-1} WA_{k,m*2+1} * \text{abs}(P_{k,m*2+1} - P_{0,m*2+1}) + \sum_{m=1}^{2} WA_{k,m*2-1} * \text{abs}(P_{k,m*2-1} - P_{0,m*2-1}) \right),$$

wherein $P_{k,m}$ is an intensity for a neighboring sample k, $WA_{k,m}$ is a weighting parameter for the neighboring sample k, and M is a sample value.

The methods can include wherein the bilateral filter is based on $$\frac{1}{\sum_{m=-M/2}^{M/2} WA_{k,m}} *$$

$$\left( WA_0 * (P_{k,0} - P_{0,0}) + \sum_{m=-2}^{-1} WA_{m*2+1} * \text{abs}(P_{k,m*2+1} - P_{0,m*2+1}) + \sum_{m=1}^{2} WA_{m*2-1} * \text{abs}(P_{k,m*2-1} - P_{0,m*2-1}) \right),$$

wherein $P_{k,m}$ is an intensity for a neighboring sample k, $WA_{k,m}$ is a weighting parameter for the neighboring sample k, and M is a sample value.

The methods can include wherein a partial sample window is based on one or more of: a block size, a block shape, a block QP, or a block mode.

The methods can include wherein the bilateral filter comprises coefficients whose values are dependent on distance from neighboring samples and values of the neighboring samples.

Figure 16:
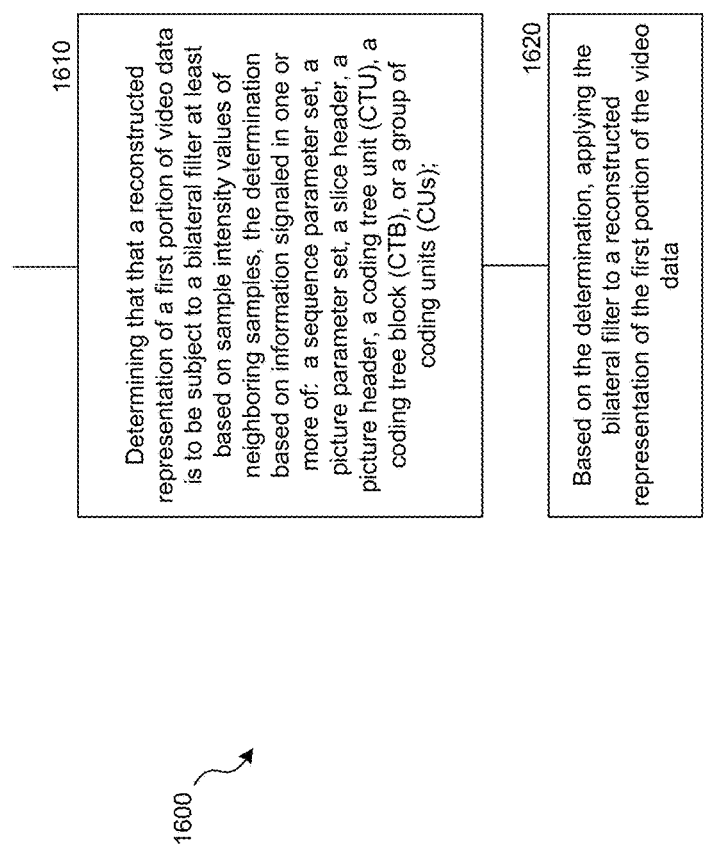
FIG. 16 is a flowchart for an example of a video bitstream processing method.

FIG. 16 is a flowchart for an example of a video bitstream processing method. The method includes determining (1610), by a processor, that a reconstructed representation of a first portion of video data is to be subject to a bilateral filter at least based on sample intensity values of neighboring samples, the determination based on information signaled in one or more of: a sequence parameter set, a picture parameter set, a slice header, a picture header, a coding tree unit (CTU), a coding tree block (CTB), or a group of coding units (CUs); and based on the determination, applying (1620) the bilateral filter to a reconstructed representation of the first portion of the video data.

Figure 17:
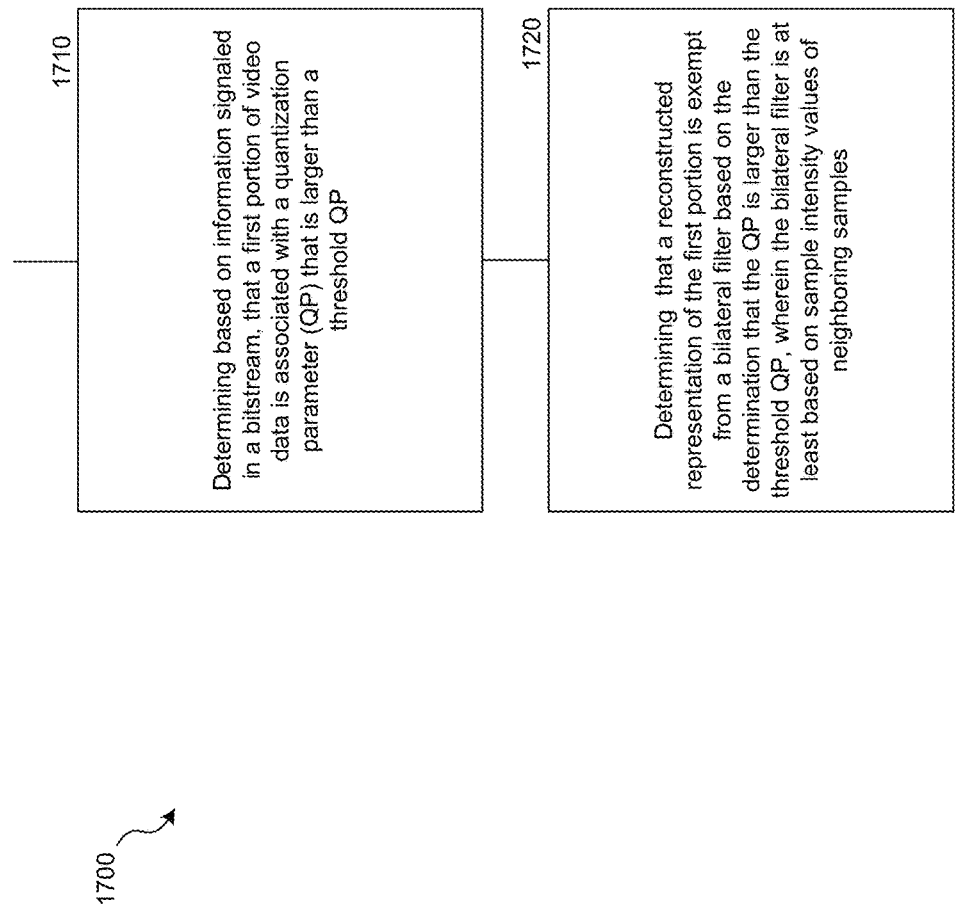
FIG. 17 is a flowchart for an example of a video bitstream processing method.

FIG. 17 is a flowchart for an example of a video bitstream processing method. The method includes determining (1710), by a processor, based on information signaled in a bitstream, that a first portion of video data is associated with a quantization parameter (QP) that is larger than a threshold QP; and determining (1720) that a reconstructed representation of the first portion is exempt from a bilateral filter based on the determination that the QP is larger than the threshold QP, wherein the bilateral filter is at least based on sample intensity values of neighboring samples.

Figure 18:
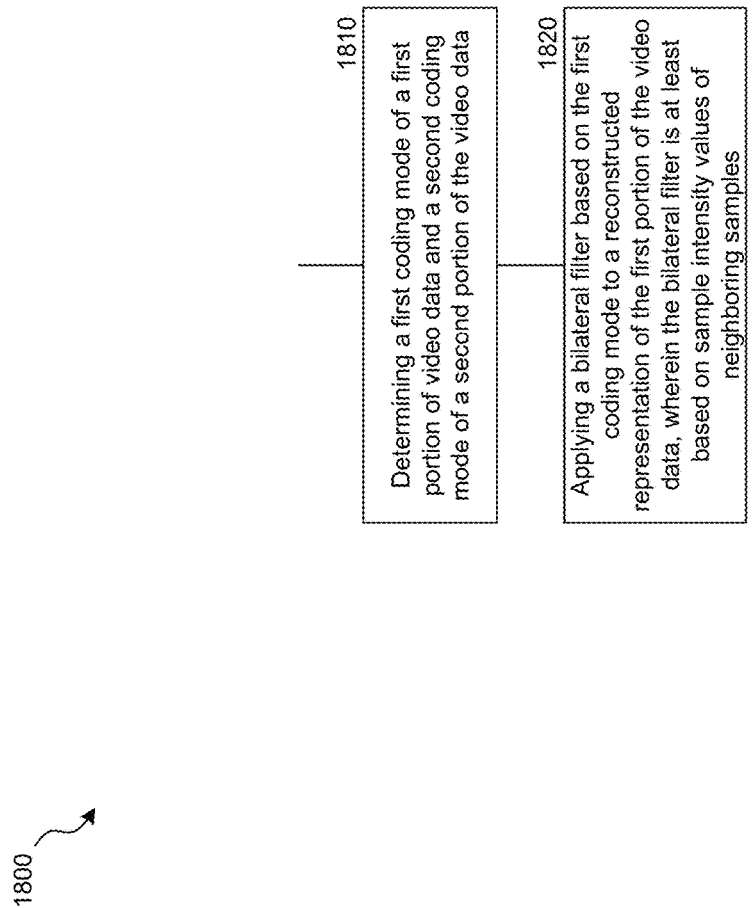
FIG. 18 is a flowchart for an example of a video bitstream processing method.

FIG. 18 is a flowchart for an example of a video bitstream processing method. The method includes determining (1810), by a processor, a first coding mode of a first portion of video data and a second coding mode of a second portion of the video data; and applying (1820) a bilateral filter based on the first coding mode to a reconstructed representation of the first portion of the video data, wherein the bilateral filter is at least based on sample intensity values of neighboring samples.

Figure 19:
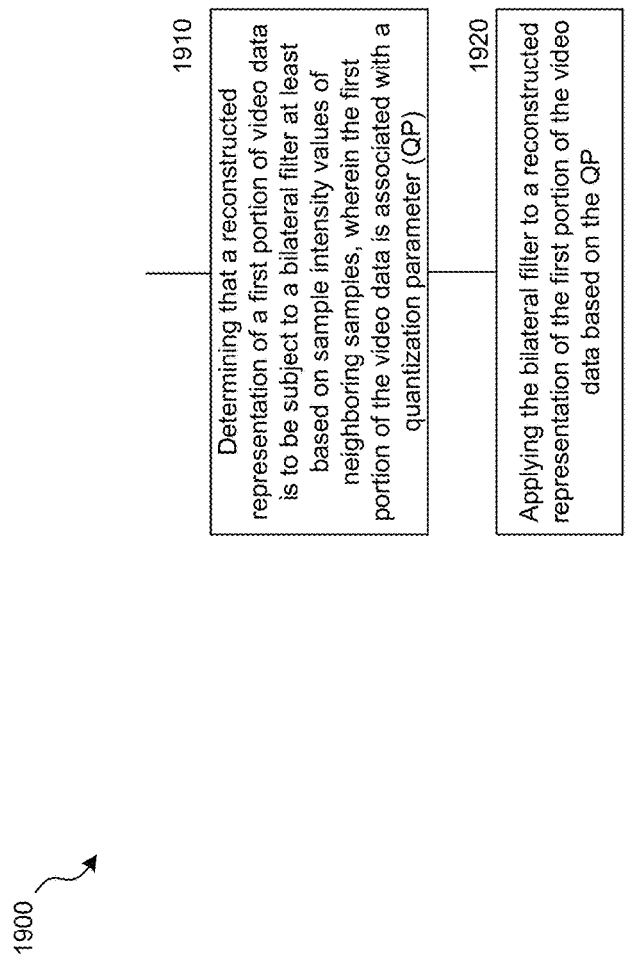
FIG. 19 is a flowchart for an example of a video bitstream processing method.

FIG. 19 is a flowchart for an example of a video bitstream processing method. The method includes determining (1910), by a processor, that a reconstructed representation of a first portion of video data is to be subject to a bilateral filter at least based on sample intensity values of neighboring samples, wherein the first portion of the video data is associated with a quantization parameter (QP); and applying (1920) the bilateral filter to the reconstructed representation of the first portion of the video data based on the QP.

Figure 20:
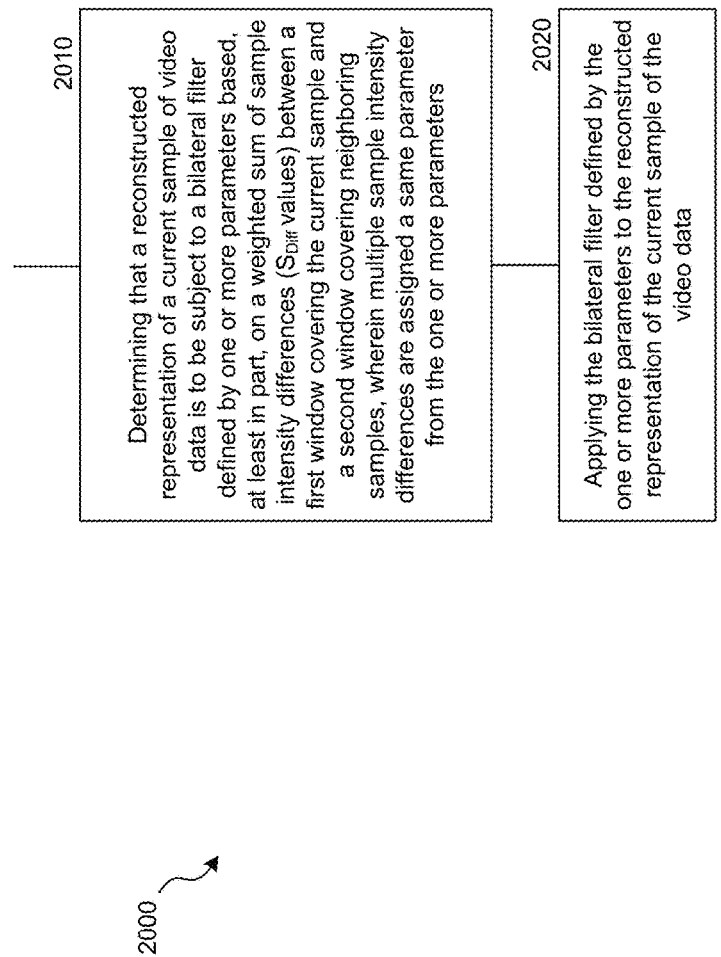
FIG. 20 is a flowchart for an example of a video bitstream processing method.

FIG. 20 is a flowchart for an example of a video bitstream processing method. The method includes determining (2010), by a processor, that a reconstructed representation of a current sample of video data is to be subject to a bilateral filter defined by one or more parameters based, at least in part, on a weighted sum of sample intensity differences ($S_{Diff}$ values) between a first window covering the current sample and a second window covering neighboring samples, wherein multiple sample intensity differences are assigned a same parameter from the one or more parameters; and applying (2020) the bilateral filter defined by the one or more parameters to the reconstructed representation of the current sample of the video data.

Figure 21:
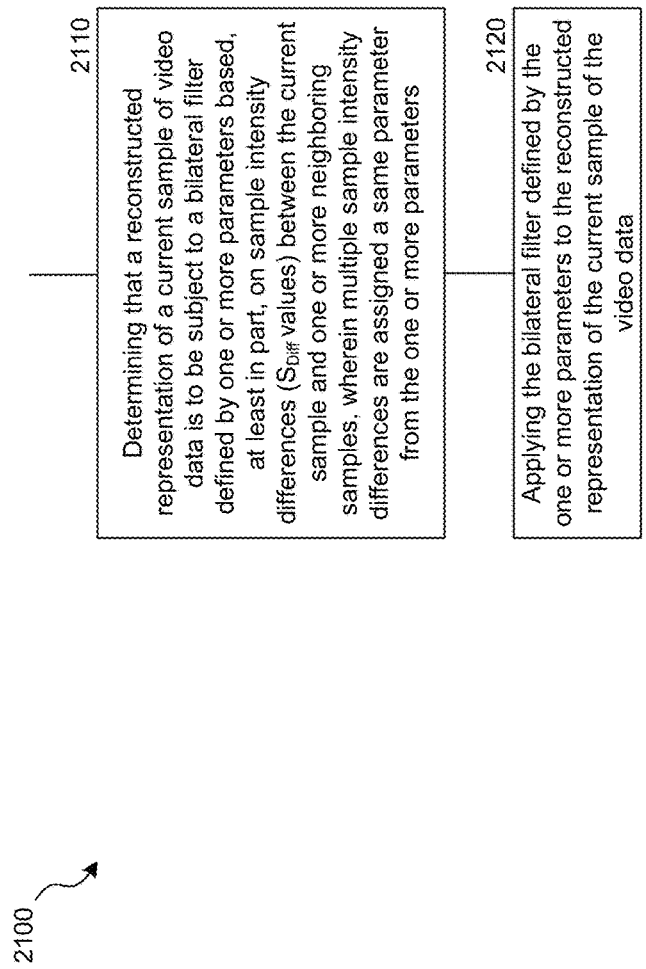
FIG. 21 is a flowchart for an example of a video bitstream processing method.

FIG. 21 is a flowchart for an example of a video bitstream processing method. The method includes determining (2110), by a processor, that a reconstructed representation of a current sample of video data is to be subject to a bilateral filter defined by one or more parameters based, at least in part, on sample intensity differences ($S_{Diff}$ values) between the current sample and one or more neighboring samples, wherein multiple sample intensity differences are assigned a same parameter from the one or more parameters; and applying (2120) the bilateral filter defined by the one or more parameters to the reconstructed representation of the current sample of the video data.

Figure 22:
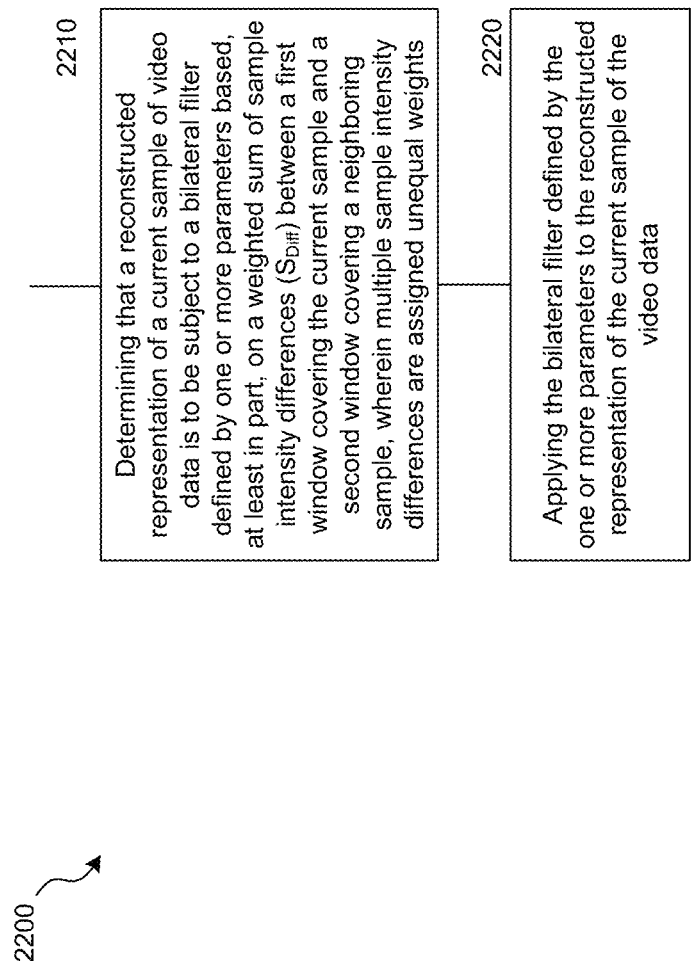
FIG. 22 is a flowchart for an example of a video bitstream processing method.

FIG. 22 is a flowchart for an example of a video bitstream processing method. The method includes determining (2210), by a processor, that a reconstructed representation of a current sample of video data is to be subject to a bilateral filter defined by one or more parameters based, at least in part, on a weighted sum of sample intensity differences ($S_{Diff}$) between a first window covering the current sample and a second window covering a neighboring sample, wherein multiple sample intensity differences are assigned unequal weights; and applying (2220) the bilateral filter defined by the one or more parameters to the reconstructed representation of the current sample of the video data.

Figure 23:
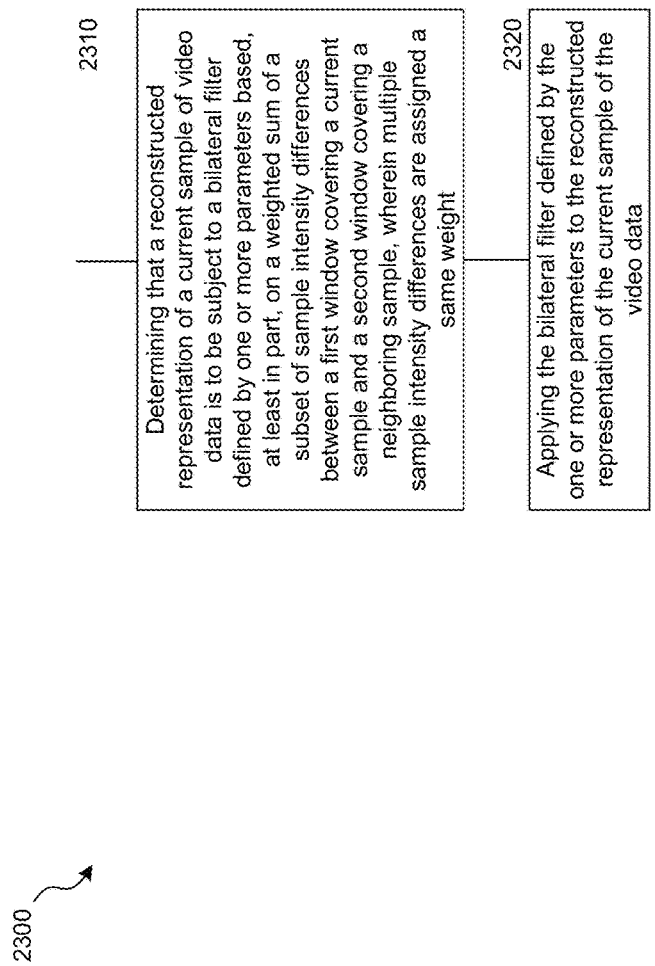
FIG. 23 is a flowchart for an example of a video bitstream processing method.

FIG. 23 is a flowchart for an example of a video bitstream processing method. The method includes determining (2310), by a processor, that a reconstructed representation of a current sample of video data is to be subject to a bilateral filter defined by one or more parameters based, at least in part, on a weighted sum of a subset of sample intensity differences between a first window covering a current sample and a second window covering a neighboring sample, wherein multiple sample intensity differences are assigned a same weight; and applying (2320) the bilateral filter defined by the one or more parameters to the reconstructed representation of the current sample of the video data.

Figure 24:
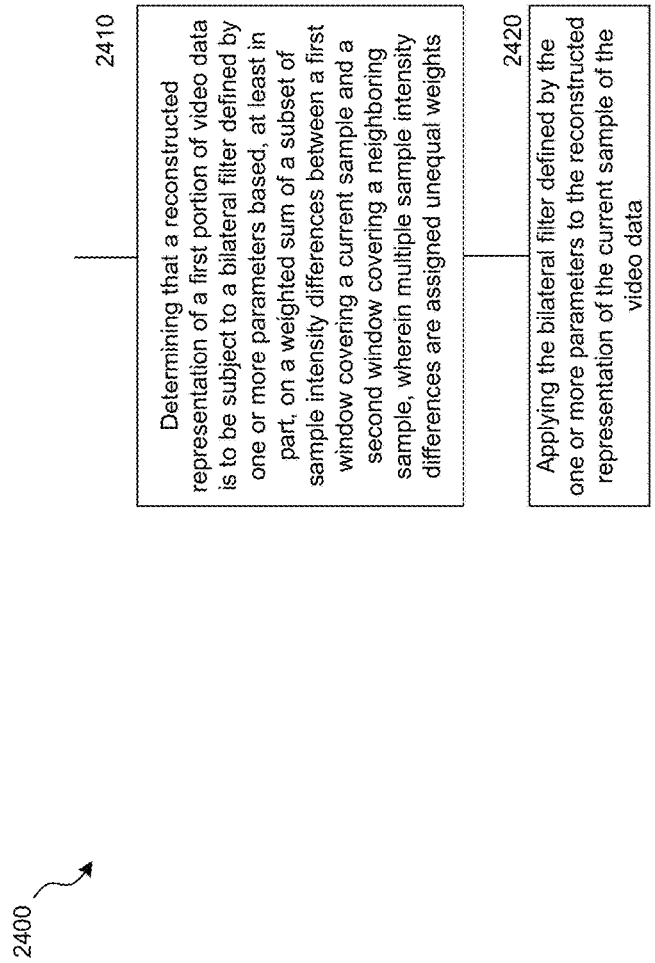
FIG. 24 is a flowchart for an example of a video bitstream processing method.

FIG. 24 is a flowchart for an example of a video bitstream processing method. The method includes determining (2410), by a processor, that a reconstructed representation of a first portion of video data is to be subject to a bilateral filter defined by one or more parameters based, at least in part, on a weighted sum of a subset of sample intensity differences between a first window covering a current sample and a second window covering a neighboring sample, wherein multiple sample intensity differences are assigned unequal weights; and applying (2420) the bilateral filter defined by the one or more parameters to the reconstructed representation of the current sample of the video data.

Some embodiments of the present document are provided in clause-based format as follows. These embodiments include further variations and aspect of techniques described in Examples 1 to 7 in Section 4 of this document.

A1. A method for video bitstream processing, comprising:
determining, by a processor, that a reconstructed representation of a first portion of video data is to be subject to a bilateral filter at least based on sample intensity values of neighboring samples, the determination based on information signaled in one or more of: a sequence parameter set, a picture parameter set, a slice header, a picture header, a coding tree unit (CTU), a coding tree block (CTB), or a group of coding units (CUs); and
based on the determination, applying the bilateral filter to a reconstructed representation of the first portion of the video data.

A2. The method of clause A1, further comprising:
determining, by the processor, one or both of: a quantization parameter (QP) of a second portion of the video data, or a minimum size of coding blocks (CBs) or CUs of the second portion of the video data; and
determining, by the processor, that a reconstructed representation of the second portion is exempt from the bilateral filter.

A3. The method of any one or more of clauses A1-A2, wherein the determination that the reconstructed representation of the first portion of the video data is to be subject to the bilateral filter is based on the QP or the minimum size of CBs or CUs of the first portion of the video data.

A4. The method of clause A2, further comprising:
determining, by the processor, that a quantization parameter (QP) related to the second portion of the video data is larger than a first threshold number; and
determining, by the processor, that the reconstructed representation of the second portion is exempt from the bilateral filter based on the QP being larger than the first threshold number.

A5. The method of clause A2, further comprising:
determining, by the processor, that a quantization parameter (QP) related to the second portion of the video data is smaller than a second threshold number; and
determining, by the processor, that the reconstructed representation of the second portion is exempt from the bilateral filter based on the QP being smaller than the second threshold number.

A6. The method of clause A1-A4, wherein the information is exempt from being signaled upon determining that the QP related to the second portion of the video data is larger than the first threshold number or the QP related to the first portion of the video data is larger than the first threshold number.

A7. The method of clause A1-A5, wherein the information is exempt from being signaled upon determining that the QP related to the second portion of the video data is smaller than the second threshold number or the QP related to the first portion of the video data is smaller than the second threshold number.

A8. The method of any of clauses A4-A7, wherein the first threshold number is provided in a bitstream related to the second portion, and wherein the first threshold number is 18.

B1. A method for video bitstream processing, comprising:
determining, by a processor, based on information signaled in a bitstream, that a first portion of video data is associated with a quantization parameter (QP) that is larger than a threshold QP; and
determining that a reconstructed representation of the first portion is exempt from a bilateral filter based on the determination that the QP is larger than the threshold QP, wherein the bilateral filter is at least based on sample intensity values of neighboring samples.

B2. The method of clause B1, wherein the threshold QP is defined in one or more of: a sequence parameter set, a picture parameter set, or a slice header.

C1. A method for video bitstream processing, comprising:
determining, by a processor, a first coding mode of a first portion of video data and a second coding mode of a second portion of the video data; and
applying a bilateral filter based on the first coding mode to a reconstructed representation of the first portion of the video data, wherein the bilateral filter is at least based on sample intensity values of neighboring samples.

C2. The method of clause C1, wherein a strength of the bilateral filter is based, at least in part, on the first coding mode and/or the second coding mode.

C3. The method of clause C2, further comprising:
determining, by the processor, that a reconstructed representation of the second portion of the video data is exempt from the bilateral filter based on the determination that the second coding mode is sub-block-based prediction.

C4. The method of clause C2, wherein the first coding mode includes sub-block-based prediction, wherein the second coding mode excludes sub-block-based prediction, and wherein the strength of the bilateral filter applied to the reconstructed representation of the first portion of the video data is higher than the strength of the bilateral filter applied to a reconstructed representation of the second portion of the video data.

C5. The method of clause C2, wherein the first coding mode includes sub-block-based prediction, wherein the second coding mode excludes sub-block-based prediction, and wherein the strength of the bilateral filter applied to the reconstructed representation of the first portion of the video data is lower than the strength of the bilateral filter applied to a reconstructed representation of the second portion of the video data.

C6. The method of clause C2, wherein the first coding mode includes overlapped block motion compensation (OBMC), wherein the second coding mode excludes OBMC, and wherein the strength of the bilateral filter applied to the reconstructed representation of the first portion of the video data is lower than the strength of the bilateral filter applied to a reconstructed representation of the second portion of the video data.

C7. The method of clause C2, wherein the first coding mode includes multi-hypothesis prediction, wherein the second coding mode excludes multi-hypothesis prediction, and wherein the strength of the bilateral filter applied to the reconstructed representation of the first portion of the video data is lower than the strength of the bilateral filter applied to a reconstructed representation of the second portion of the video data.

C8. The method of clause C2, wherein the first coding mode and the second coding mode includes intra coding, wherein the first portion of the video data is larger than the second portion of the video data, and wherein the strength of the bilateral filter applied to the reconstructed representation of the first portion of the video data is lower than the strength of the bilateral filter applied to a reconstructed representation of the second portion of the video data.

D1. A method for video bitstream processing, comprising:
determining, by a processor, that a reconstructed representation of a first portion of video data is to be subject to a bilateral filter at least based on sample intensity values of neighboring samples, wherein the first portion of the video data is associated with a quantization parameter (QP); and
applying the bilateral filter to the reconstructed representation of the first portion of the video data based on the QP.

D2. The method of clause D1, wherein the QP is based on a picture level QP of a picture that includes the first portion.

D3. The method of clause D1, wherein the QP is based on a slice QP of a slice that includes the first portion.

D4. The method of clause D1, wherein the QP is based on a returned value of a function related to QPs of other portions coded before the first portion.

D5. The method of clause D4, wherein the function includes an average function.

D6. The method of clause D4, wherein the function includes a linear function.

D7. The method of clause D4, wherein the other portions coded before the first portion are within a same coding tree unit (CTU), CTU row, or slice as the first portion.

D8. The method of clause D4, wherein the other portions coded before the first portion cover a reference portion of the first portion.

E1. A method for video bitstream processing, comprising:
determining, by a processor, that a reconstructed representation of a current sample of video data is to be subject to a bilateral filter defined by one or more parameters based, at least in part, on a weighted sum of sample intensity differences ($S_{Diff}$ values) between a first window covering the current sample and a second window covering neighboring samples, wherein multiple sample intensity differences are assigned a same parameter from the one or more parameters; and
applying the bilateral filter defined by the one or more parameters to the reconstructed representation of the current sample of the video data.

E2. A method for video bitstream processing, comprising:
determining, by a processor, that a reconstructed representation of a current sample of video data is to be subject to a bilateral filter defined by one or more parameters based, at least in part, on sample intensity differences ($S_{Diff}$ values) between the current sample and one or more neighboring samples, wherein multiple sample intensity differences are assigned a same parameter from the one or more parameters; and
applying the bilateral filter defined by the one or more parameters to the reconstructed representation of the current sample of the video data.

E3. The method of any one or more of clauses E1-E2, wherein the one or more neighboring samples are adjacent to the current sample.

E4. The method of any one or more of clauses E1-E2, wherein the one or more neighboring samples are non-adjacent to the current sample.

E5. The method of clauses E1, wherein the first window and/or the second window is of size 3×3.

E6. The method of any one or more of clauses E1-E2, wherein the one or more parameters correspond to intermediate values.

E7. The method of any one or more of clauses E1-E2, wherein the one or more parameters correspond to final values.

E8. The method of any one or more of clauses E1-E7, wherein the $S_{Diff}$ values are quantized to generate quantized values, and the quantized values are used to determine the one or more parameters.

E9. The method of clause E8, wherein generating the quantized value includes a linear quantization.

E10. The method of clause E9, wherein the one or more parameters are further based on a ratio $S_{Diff}$/stepSize, wherein $S_{Diff}$ is a sample intensity difference and stepSize is defined as an integer number.

E11. The method of clause E9, wherein the one or more parameters are further based on a ratio ($S_{Diff}$+offset)/stepSize, wherein $S_{Diff}$ is a sample intensity difference, offset is defined as a number, and stepSize is defined as an integer number.

E12. The method of clause E11, wherein the offset is defined as stepSize/2.

E13. The method of any one or more of clauses E10-E12, wherein stepSize is a predetermined value.

E14. The method of any one or more of clauses E10-E12, wherein stepSize is based on one or more of: a quantization parameter (QP), a block size, a block shape, or a coding mode.

E15. The method of clause E8, wherein generating the quantized values includes non-linear quantization.

E16. The method of clause E15, wherein the one or more parameters are further based on a quant function that generates the quantized values based on $S_{Diff}$ and stepSize.

E17. The method of clause E15, wherein the one or more parameters are further based on a quant function that generates the quantized values based on $S_{Diff}$.

E18. The method of clauses E16 or E17, wherein stepSize is predetermined.

E19. The method of clauses E16 or E17, wherein stepSize is based on one or more of: a quantization parameter (QP), a block size, a block shape, a coding mode, a prediction method, or motion information.

E20. The method of clauses E16 or E17, wherein the quant function is predetermined.

E21. The method of any one or more of clauses E1-E20, wherein the same parameter is assigned based on a $S_{Diff}$ value being larger than N or smaller than −M, N and M being positive values.

E22. The method of clause E21, wherein a total number of the one or more parameters is greater for smaller $S_{Diff}$ values in comparison to a total number of the one or more parameters for larger $S_{Diff}$ values.

E23. The method of clauses E21 or E22, wherein N or M are based on one or more of: coded mode information, block size, block shape, prediction method, motion information, motion information, or QP values.

E24. The method of any one or more of clauses E8 to E23, wherein at least one of the quantized values is used as an entry index to a pre-defined table.

F1. A method for video bitstream processing, comprising:
determining, by a processor, that a reconstructed representation of a current sample of video data is to be subject to a bilateral filter defined by one or more parameters based, at least in part, on a weighted sum of sample intensity differences ($S_{Diff}$) between a first window covering the current sample and a second window covering a neighboring sample, wherein multiple sample intensity differences are assigned unequal weights; and
applying the bilateral filter defined by the one or more parameters to the reconstructed representation of the current sample of the video data.

F2. The method of any one or more of clauses F1, wherein the neighboring sample is adjacent to the current sample.

F3. The method of any one or more of clauses F1, wherein the neighboring sample is non-adjacent to the current sample.

F4. The method of any one or more of clauses F1-F3, wherein the first window and/or the second window is of size 3×3.

F5. The method of any one or more of clauses F1-F4, wherein the one or more parameters are expressed as $$\frac{\sum_{m=-M/2}^{M/2} \text{abs}(P_{k,m} - P_{0,m}) * WA_{k,m}}{\sum_{m=-M/2}^{M/2} WA_{k,m}},$$

wherein $P_{k,m}$ and $P_{0,m}$ represent intensity values of the m-th sample within corresponding windows centered at $P_{k,0}$ and $P_{0,0}$, respectively for a neighboring sample k, $WA_{k,m}$ is a weight for the m-th sample of the neighboring sample k, and M is a total number of windowed samples.

F6. The method of any one or more of clauses F1-F4, wherein the one or more parameters are expressed as $$\frac{\sum_{m=-M/2}^{M/2} \text{abs}(P_{k,m} - P_{0,m}) * WA_m}{\sum_{m=-M/2}^{M/2} WA_m},$$

wherein $P_{k,m}$ and $P_{0,m}$ represent intensity values of the m-th sample within corresponding windows centered at $P_{k,0}$ and $P_{0,0}$, respectively for a neighboring sample k, $WA_m$ is a weight for the m-th sample value and is same for all neighboring samples, and M is a total number of windowed samples.

F7. The method of any one or more of clauses F1-F6, wherein the unequal weights are predetermined.

F8. The method of any one or more of clauses F1-F6, wherein the unequal weights are larger when m=0 than when m>0.

F9. The method of any one or more of clauses F1-F6, wherein the unequal weights are based on one or more of: a quantization parameter (QP), a block size, a shape, or a coding mode.

F10. The method of any one or more of clauses F1-F6, wherein the unequal weights are applicable with any bilateral filter kernel.

G1. A method for video bitstream processing, comprising:
determining, by a processor, that a reconstructed representation of a current sample of video data is to be subject to a bilateral filter defined by one or more parameters based, at least in part, on a weighted sum of a subset of sample intensity differences between a first window covering a current sample and a second window covering a neighboring sample, wherein multiple sample intensity differences are assigned a same weight; and
applying the bilateral filter defined by the one or more parameters to the reconstructed representation of the current sample of the video data.

H1. A method for video bitstream processing, comprising:
determining, by a processor, that a reconstructed representation of a first portion of video data is to be subject to a bilateral filter defined by one or more parameters based, at least in part, on a weighted sum of a subset of sample intensity differences between a first window covering a current sample and a second window covering a neighboring sample, wherein multiple sample intensity differences are assigned unequal weights; and
applying the bilateral filter defined by the one or more parameters to the reconstructed representation of the current sample of the video data.

H2. The method of any one or more of clauses G1-H1, wherein the subset is based on a center sample and four samples cornering the center sample within the first window and the second window.

H3. The method of any one or more of clauses G1-H2, wherein the one or more parameters are expressed as $1/5\sum_{m=-(N+1)/2}^{(N+1)/2} \text{abs}(P_{k,m*2} - P_{0,m*2})$, wherein $P_{k,m}$ represents an intensity value of the m-th sample within a window centered at $P_{k,0}$ for a neighboring sample k, and N*N is a size of the first and second windows.

H4. The method of any one or more of clauses G1-H2, wherein the one or more parameters are expressed as $$\frac{1}{\sum_{m=-M/2}^{M/2} WA_{k,m}} * \left( \sum_{m=-(N+1)/2}^{(N+1)/2} \text{abs}(P_{k,m*2} - P_{0,m*2}) * WA_{k,m*2} \right),$$

wherein $P_{k,m}$ represents an intensity value of the m-th sample within a window centered at $P_{k,0}$ for a neighboring sample k, $WA_{k,m}$ is a weight for the m-th sample of the neighboring sample k, and N*N is a size of the first and the second windows.

H5. The method of any one or more of clauses G1-H2, wherein the one or more parameters are expressed as $$\frac{1}{\sum_{m=-M/2}^{M/2} WA_{k,m}} * \left( \sum_{m=-(N+1)/2}^{(N+1)/2} \text{abs}(P_{k,m*2} - P_{0,m*2}) * WA_{m*2} \right),$$

wherein $P_{k,m}$ represents an intensity value of the m-th sample within a window centered at $P_{k,0}$ for a neighboring sample k, $WA_{k,m}$ is a weight for the m-th sample of the neighboring sample k, and N*N is a size of the first and second windows.

H6. The method of any one or more of clauses G1-H1, wherein the subset is based on a center sample and four samples neighboring the center sample.

H7. The method of any one or more of clauses G1-H6, wherein the one or more parameters are expressed as $1/5 (P_{k,0}-P_{0,0})+\Sigma_{m=-1}^{-1} abs(P_{k,m*2+1}-P_{0,m*2+1})+\Sigma_{m=1}^{2} abs(P_{k,m*2-1}-P_{0,m*2-1}))$, wherein $P_{k,m}$ represents an intensity value of the m-th sample within a window centered at $P_{k,0}$ for a neighboring sample k, and N*N is a size of the first and second windows.

H8. The method of any one or more of clauses G1-H6, wherein the one or more parameters is expressed as $$\frac{1}{\sum_{m=-M/2}^{M/2} WA_{k,m}} * \left( WA_{k,0} * (P_{k,0} - P_{0,0}) + \sum_{m=-2}^{-1} WA_{k,m*2+1} * abs(P_{k,m*2+1} - P_{0,m*2+1}) + \sum_{m=1}^{2} WA_{k,m*2+1} * abs(P_{k,m*2-1} - P_{0,m*2-1}) \right),$$

wherein $P_{k,m}$, represents an intensity value of the m-th sample within a window centered at $P_{k,0}$ for a neighboring sample k, $WA_{k,m}$ is a weight for the m-th sample of the neighboring sample k, and N*N is a size of the first and second windows.

H9. The method of any one or more of clauses G1-H6, wherein the one or more parameters is expressed as $$\frac{1}{\sum_{m=-M/2}^{M/2} WA_{k,m}} * \left( WA_{0} * (P_{k,0} - P_{0,0}) + \sum_{m=-2}^{-1} WA_{m*2+1} * abs(P_{k,m*2+1} - P_{0,m*2+1}) + \sum_{m=1}^{2} WA_{m*2-1} * abs(P_{k,m*2-1} - P_{0,m*2-1}) \right),$$

wherein $P_{k,m}$ represents an intensity value of the m-th sample within a window centered at $P_{k,0}$ for a neighboring sample k, $WA_{k,m}$ is a weight for the m-th sample of the neighboring sample k, and N*N is a size of the first and second windows.

H10. The method of any one or more of clauses G1-H6, wherein the subset of sample intensity differences is based on one or more of: a block size, a block shape, a block QP, or a block mode.

I1. A video decoding apparatus comprising a processor configured to implement a method recited in one or more of clauses 1 to XX.

I2. A video encoding apparatus comprising a processor configured to implement a method recited in one or more of clauses 1 to XX.

I3. A computer program product having computer code stored thereon, the code, when executed by a processor, causes the processor to implement a method recited in any of clauses 1 to XX.

I4. A method, apparatus or system described in the present document.

In connection with the definition of bilateral filters, in some embodiments, the terms "weight," "parameter," and "weighting parameter" can be generally synonymous. In some other embodiments, a weight can be interpreted as a parameter. That is, a bilateral filter can have other parameters in addition to weights or weighting parameters.

It will be appreciated that the disclosed techniques may be embodied in video encoders or decoders to improve compression efficiency when the coding units being compressed have shaped that are significantly different than the traditional square shaped blocks or rectangular blocks that are half-square shaped. For example, new coding tools that use long or tall coding units such as 4×32 or 32×4 sized units may benefit from the disclosed techniques.

Figure 25:
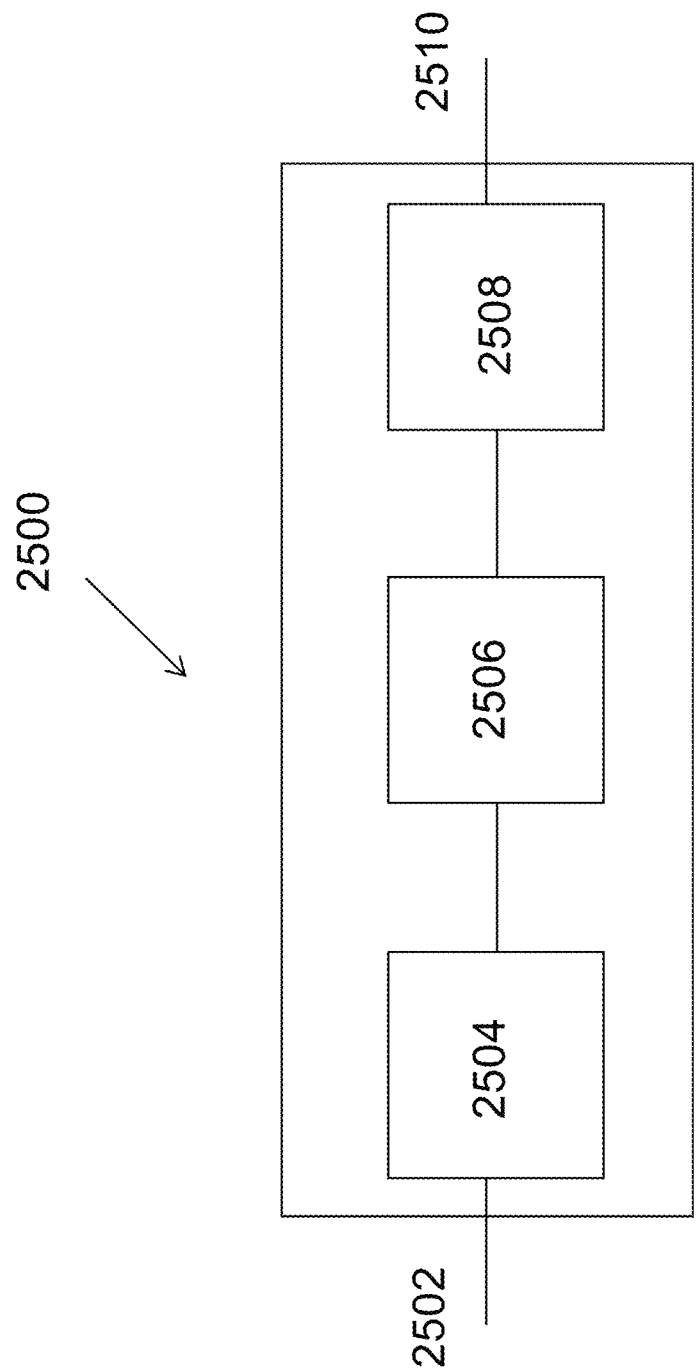
FIG. 25 is a block diagram of an example video processing system in which disclosed techniques may be implemented.

FIG. 25 is a block diagram showing an example video processing system 2500 in which various techniques disclosed herein may be implemented. Various implementations may include some or all of the components of the system 2500. The system 2500 may include input 2502 for receiving video content. The video content may be received in a raw or uncompressed format, e.g., 8 or 10 bit multi-component pixel values, or may be in a compressed or encoded format. The input 2502 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2500 may include a coding component 2504 that may implement the various coding or encoding methods described in the present document. The coding component 2504 may reduce the average bitrate of video from the input 2502 to the output of the coding component 2504 to produce a coded representation of the video. The coding techniques are therefore sometimes called video compression or video transcoding techniques. The output of the coding component 2504 may be either stored, or transmitted via a communication connected, as represented by the component 2506. The stored or communicated bitstream (or coded) representation of the video received at the input 2502 may be used by the component 2508 for generating pixel values or displayable video that is sent to a display interface 2510. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any implementations or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for coding video data, comprising:

determining, for a conversion between a video and a bitstream of the video, that a reconstructed representation of a current sample of video data is to be subject to a bilateral filter defined by one or more parameters based, at least in part, on a weighted sum of sample intensity differences ($S_{Diff}$) between a first window covering the current sample and a second window covering a neighboring sample, wherein multiple sample intensity differences between samples and the current sample inside the first window are assigned unequal weights and multiple sample intensity differences between samples and the neighboring sample inside the second window are assigned unequal weights; and performing, by applying the bilateral filter defined by the one or more parameters to the reconstructed representation of the current sample of the video data, the conversion, wherein a weight of a center sample in the first window is larger than that of a non-center sample in the first window or a weight of a center sample in the second window is larger than that of a non-center sample in the second window.

2. The method of claim 1, wherein the neighboring sample is adjacent to the current sample.

3. The method of claim 1, wherein the neighboring sample is non-adjacent to the current sample.

4. The method of claim 1, wherein the first window and/or the second window is of size 3×3.

5. The method of claim 1, wherein the one or more parameters are expressed as $$\frac{\sum_{m=-M/2}^{M/2} \text{abs}(P_{k,m} - P_{0,m}) * WA_{k,m}}{\sum_{m=-M/2}^{M/2} WA_{k,m}},$$

wherein $P_{k,m}$ and $P_{0,m}$ represent intensity values of the m-th sample within corresponding windows centered at $P_{k,0}$ and $P_{0,0}$, respectively for a neighboring sample k, $WA_{k,m}$ is a weight for the m-th sample of the neighboring sample k, and M is a total number of windowed samples.

6. The method of claim 1, wherein the one or more parameters are expressed as $$\frac{\sum_{m=-M/2}^{M/2} \text{abs}(P_{k,m} - P_{0,m}) * WA_m}{\sum_{m=-M/2}^{M/2} WA_m},$$

wherein $P_{k,m}$ and $P_{0,m}$ represent intensity values of the m-th sample within corresponding windows centered at $P_{k,m}$ and $P_{0,m}$ respectively for a neighboring sample k, $WA_m$ is a weight for the m-th sample value and is same for all neighboring samples, and M is a total number of windowed samples.

7. The method of claim 1, wherein the unequal weights are predetermined.

8. The method of claim 1, wherein the unequal weights are based on one or more of: a quantization parameter (QP), a block size, a shape, or a coding mode.

9. The method of claim 1, wherein the unequal weights are applicable with any bilateral filter kernel.

10. The method of claim 1, wherein the conversion includes encoding the video into the bitstream.

11. The method of claim 1, wherein the conversion includes decoding the video from the bitstream.

12. The method of claim 1, wherein the conversion includes generating the bitstream from the video; and the method further comprises:
storing the bitstream in a non-transitory computer-readable recording medium.

13. An apparatus for processing video data comprising a processor and a non-transitory memory with instructions thereon, wherein the instructions upon execution by the processor, cause the processor to:
determine, for a conversion between a video and a bitstream of the video, that a reconstructed representation of a current sample of video data is to be subject to a bilateral filter defined by one or more parameters based, at least in part, on a weighted sum of sample intensity differences ($S_{Diff}$) between a first window covering the current sample and a second window covering a neighboring sample, wherein multiple sample intensity differences between samples and the current sample inside the first window are assigned unequal weights and multiple sample intensity differences between samples and the neighboring sample inside the second window are assigned unequal weights; and perform, by applying the bilateral filter defined by the one or more parameters to the reconstructed representation of the current sample of the video data, the conversion, wherein a weight of a center sample in the first window is larger than that of a non-center sample in the first window or a weight of a center sample in the second window is larger than that of a non-center sample in the second window.

14. The apparatus of claim 13, wherein the neighboring sample is adjacent to the current sample.

15. The apparatus of claim 13, wherein the neighboring sample is non-adjacent to the current sample.

16. The apparatus of claim 13, wherein the first window and/or the second window is of size 3×3.

17. The apparatus of claim 13, wherein the one or more parameters are expressed as $$\frac{\sum_{m=-M/2}^{M/2} \text{abs}(p_{k,m} - p_{0,m}) * w_{A_{k,m}}}{\sum_{m=-M/2}^{M/2} w_{A_{k,m}}},$$

wherein and $P_{k,m}$ and $P_{0,m}$ represent intensity values of the m-th sample within corresponding windows centered at $P_{k,0}$ and $P_{0,0}$, respectively for a neighboring sample k, $WA_{k,m}$ is a weight for the m-th sample of the neighboring sample k, and M is a total number of windowed samples.

18. The apparatus of claim 13, wherein the one or more parameters are expressed as $$\frac{\sum_{m=-M/2}^{M/2} \text{abs}(P_{k,m} - P_{0,m}) * WA_m}{\sum_{m=-M/2}^{M/2} WA_m},$$

wherein and $P_{k,m}$ and $P_{0,m}$ represent intensity values of the m-th sample within corresponding windows centered at $P_{k,0}$ and $P_{0,0}$, respectively for a neighboring sample k, $WA_m$ is a weight for the m-th sample value and is same for all neighboring samples, and M is a total number of windowed samples.

19. The apparatus of claim 13, wherein the one or more parameters are expressed as $$\frac{\sum_{m=-M/2}^{M/2} \text{abs}(p_{k,m} - p_{0,m}) * w_{A_m}}{\sum_{m=-M/2}^{M/2} w_{A_m}},$$

wherein $P_{k,m}$ and $P_{0,m}$ represent intensity values of the m-th sample within corresponding windows centered at $P_{k,0}$ and $P_{0,0}$, respectively for a neighboring sample k, $WA_m$ is a weight for the m-th sample value and is same for all neighboring samples, and M is a total number of windowed samples.

20. A non-transitory computer-readable recording medium storing a bitstream of a video which is generated by a method performed by a video processing apparatus, wherein the method comprises:
- determining, for a conversion between a video and a bitstream of the video, that a reconstructed representation of a current sample of video data is to be subject to a bilateral filter defined by one or more parameters based, at least in part, on a weighted sum of sample intensity differences ($S_{Diff}$) between a first window covering the current sample and a second window covering a neighboring sample, wherein multiple sample intensity differences between samples and the current sample inside the first window are assigned unequal weights and multiple sample intensity differences between samples and the neighboring sample inside the second window are assigned unequal weights; and
- generating the bitstream from the video by applying the bilateral filter defined by the one or more parameters to the reconstructed representation of the current sample of the video data,
- wherein a weight of a center sample in the first window is larger than that of a non-center sample in the first window or a weight of a center sample in the second window is larger than that of a non-center sample in the second window.

* * * * *